US 9,124,899 B2

(12) United States Patent
Misra et al.

(10) Patent No.: US 9,124,899 B2
(45) Date of Patent: Sep. 1, 2015

(54) MOTION DERIVATION AND CODING FOR SCALING VIDEO

(71) Applicants: Kiran Mukesh Misra, Vancouver, WA (US); Christopher Andrew Segall, Vancouver, WA (US); Jie Zhao, Vancouver, WA (US)

(72) Inventors: Kiran Mukesh Misra, Vancouver, WA (US); Christopher Andrew Segall, Vancouver, WA (US); Jie Zhao, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 512 days.

(21) Appl. No.: 13/631,826

(22) Filed: Sep. 28, 2012

(65) Prior Publication Data

US 2014/0092970 A1 Apr. 3, 2014

(51) Int. Cl.
| H04N 19/593 | (2014.01) |
| H04N 19/52 | (2014.01) |
| H04N 19/503 | (2014.01) |
| H04N 19/513 | (2014.01) |
| H04N 19/30 | (2014.01) |
| H04N 19/587 | (2014.01) |
| H04N 19/59 | (2014.01) |

(52) U.S. Cl.
CPC ............ *H04N 19/593* (2014.11); *H04N 19/30* (2014.11); *H04N 19/503* (2014.11); *H04N 19/513* (2014.11); *H04N 19/52* (2014.11); *H04N 19/587* (2014.11); *H04N 19/59* (2014.11)

(58) Field of Classification Search
None
See application file for complete search history.

(56) References Cited

U.S. PATENT DOCUMENTS

| 7,826,673 | B2 | 11/2010 | Segall |
| 7,983,496 | B2 | 7/2011 | Liu |
| 8,085,852 | B2 | 12/2011 | Liu |
| 8,160,158 | B2 | 4/2012 | Choi |
| 8,175,168 | B2 | 5/2012 | Sun |
| 8,208,560 | B2 | 6/2012 | Chiu |
| 2006/0104354 | A1 | 5/2006 | Han et al. |
| 2008/0175495 | A1 | 7/2008 | Segall |
| 2009/0003457 | A1 | 1/2009 | Liu |
| 2009/0003718 | A1 | 1/2009 | Liu |
| 2009/0080535 | A1 | 3/2009 | Yin et al. |
| 2009/0097558 | A1 | 4/2009 | Ye |
| 2009/0097561 | A1 | 4/2009 | Chiu |
| 2009/0110073 | A1 | 4/2009 | Wu |

(Continued)

FOREIGN PATENT DOCUMENTS

| EP | 1 871 113 A1 | 12/2007 |
| EP | 2 009 921 A2 | 12/2008 |

(Continued)

OTHER PUBLICATIONS

Itani, Yusuke, et al., Improvement to AMVP/Merge Process; Joint Collaborative Team on Video Coding (JVT-VC) of ITU-T SG16 WP3 and ISO/IEC JTC1/SC29/WG11; JCTVC-E064_rl; 5th Meeting; Geneva, CH; Mar. 2011; 8 pages.

(Continued)

*Primary Examiner* — Dave Czekaj
*Assistant Examiner* — Nam Pham
(74) *Attorney, Agent, or Firm* — Stolowitz Ford Cowger LLP

(57) ABSTRACT

A system utilizing motion derivation and coding for scaling video is described. The system may include an electronic device configured to receive a first layer bitstream and a second enhancement layer bitstream corresponding to the first layer bitstream. The electronic device may be configured to derive a motion vector at the second layer representation from the first layer representation.

14 Claims, 25 Drawing Sheets

(56) References Cited

U.S. PATENT DOCUMENTS

| | | | |
|---|---|---|---|
| 2009/0323804 A1 | 12/2009 | Gao | |
| 2010/0008418 A1 | 1/2010 | Wu | |
| 2010/0008427 A1 | 1/2010 | Chiu | |
| 2010/0128786 A1 | 5/2010 | Gao | |
| 2010/0135393 A1 | 6/2010 | Ying Gao | |
| 2010/0208989 A1 | 8/2010 | Narroschke | |
| 2011/0090959 A1 | 4/2011 | Wiegand | |
| 2011/0243231 A1* | 10/2011 | Li et al. | 375/240.16 |
| 2011/0293003 A1 | 12/2011 | Luo | |
| 2011/0293013 A1 | 12/2011 | Ma | |
| 2012/0134416 A1 | 5/2012 | Lin et al. | |
| 2012/0170646 A1 | 7/2012 | Baylon | |
| 2013/0322538 A1 | 12/2013 | Seregin | |
| 2014/0086316 A1 | 3/2014 | Kerofsky | |
| 2014/0086327 A1 | 3/2014 | Ugur | |
| 2014/0092971 A1 | 4/2014 | Misra | |

FOREIGN PATENT DOCUMENTS

| | | |
|---|---|---|
| EP | 2 084 909 A1 | 8/2009 |
| EP | 2 092 747 A1 | 8/2009 |
| EP | 2 206 351 A2 | 7/2010 |
| EP | 2 396 967 A1 | 12/2011 |
| WO | 2008/049271 A1 | 5/2008 |
| WO | 2008/071036 A1 | 6/2008 |
| WO | 2008/071037 A1 | 6/2008 |
| WO | 2009-054920 A2 | 4/2009 |
| WO | 2010/006015 A2 | 1/2010 |
| WO | 2010/093432 A1 | 8/2010 |
| WO | 2013/008538 A1 | 1/2013 |
| WO | 2013/069231 A1 | 5/2013 |

OTHER PUBLICATIONS

Hong, Danny, et al., Scalability Support in HEVC; Joint Collaborative Team on Video Coding (JCT-VC) of ITU-T SG16 WP3 and ISO/IEC JTC1/SC29/WG11, JCTVC-F290r1; 6th Meeting; Torino, IT; Jul. 2011; 15 pages.

Bici, Oguz, et al., AHG10; Hook for Scalable Extensions: Signaling TMVP Reference Index in Slice Header; Joint Collaborative Team on Video Coding (JCT-VC) of ITU-T SG 16 WP 3 and ISO/IEC JTC 1/SC29/WG11; JCTVC-J0224_r1; 10th Meeting; Stockholm, SE; Jul. 2012; 6 pages.

Misra, Kiran, et al., Description of Scalable Video Coding Technology Proposal by Sharp (proposal 1); Joint Collaborative Team on Video Coding (JCT-VC) of ITU-T SG16 WP3 and ISO/IEC JTC1/SC29/WG11; JCTVC-K0031_r1; 11th Meeting; Shanghai, CN; Oct. 2012; 36 pages.

Kim, Chulkeun, et al., Description of Scalable Video Coding Technology Proposal by LG Electronics and MediaTek (differential coding mode on); Joint Collaborative Team on Video Coding (JCT-VC) of ITU-T SG16 WP3 and ISO/IEC JTC1/SC29/WG11; JCTVC-K0033_r2; 11th Meeting; Shanghai, CN; Oct. 2012; 11 pages.

Won Kang, Jung, et al., Description of Scalable Video Coding Technology Proposal of ETRI and Kwangwoon University; Joint Collaborative Team on Video Coding (JCT-VC) of ITU-T SG16 WP3 and ISO/IEC JTC1/SC29/WG11, JCTVC-K0037; 11th Meeting; Shanghai, CN; Oct. 2012; 20 pages.

International Search Report for PCT/JP2013/005707 dated Dec. 17, 2013; 3 pages.

Stolowitz Ford Cowger LLP; Listing of Related Cases; Mar. 20, 2013, 1 Page.

Danny Hong, Wonkap Jang, Jill Boyce, Adeel Abbas; JCTVC-F290: Scalability Support in HEVC; 6th Meeting Joint Collaborative Team on Video Coding (JCT-VC) of ITU-T SG16 WP3 and ISO/IEC JTC1/SC29/WG11, Torino, IT, Jul. 14-22, 2011; Version 1 dated Jul. 1, 2011; 12 Pages.

Danny Hong, Wonkap Jang, Jill Boyce, Adeel Abbas; JCTVC-F290: Scalability Support in HEVC; 6th Meeting Joint Collaborative Team on Video Coding (JCT-VC) of ITU-T SG16 WP3 and ISO/IEC JTC1/SC29/WG11, Torino, IT, Jul. 14-22, 2011; Version 2 dated Jul. 13, 2011; 32 Pages.

ITU-T Telecommunication Standardization Sector of ITU; H.264; Series H Audiovisual and Multimedia Systems; Mar. 2010; 676 pages.

M. Winken et al.; "Bit-Depth Scalable Video Coding"; in Proc. ICIP 91) 2007; pp. 5-8.

C.A. Segall et al.; Spatial Scalability Within the H.264/AVC Scalable Video Coding Extension, Circuits and Systems for Video Technology; IEEE Transactions on, 19(9); pp. 1121-1135; Sep. 2007.

ITU-R Recommendation BT.709; "Parameter Values for the HDTV Standards for Production and International Programme Exchange"; Apr. 2002; 32 pages.

Recommendation ITU-R BT.2020; "Parameter Values for Ultra-High Definition Television (UHDTV) Systems for Production and International Programme Exchange"; Aug. 2012; 7 pages.

Stolowitz Ford Cowger LLP; Updated Listing of Related Cases; Jul. 2, 2014; 1 page.

Japan Patent Office as the ISA; PCT/JP2013/004538 International Search Report and Written Opinion; Oct. 29, 2013; 5 Pages.

Luthra, Ajay et al.; "Draft Requirements and Discussion on the Scalable Enhancement of HEVC"; International Organization for Standisation; Nov. 2011, Geneva, Switzerland; 20 pages.

\* cited by examiner (background)

(background)

(background)

MOTION DERIVATION AND CODING FOR SCALING VIDEO

TECHNICAL FIELD

The present disclosure relates generally to electronic devices. More specifically, the present disclosure relates to electronic devices for coding scalable video.

BACKGROUND

In video coding there is often a significant amount of temporal correlation across pictures/frames. Most video coding standards including the up-coming high efficiency video coding (HEVC) standard exploits this temporal correlation to achieve better compression efficiency for video bitstreams. Some terms used with respect to HEVC are provided in the paragraphs that follow.

A picture is an array of luma samples in monochrome format or an array of luma samples and two corresponding arrays of chroma samples in 4:2:0, 4:2:2, and 4:4:4 colour format.

A coding block is an N×N block of samples for some value of N. The division of a coding tree block into coding blocks is a partitioning A coding tree block is an N×N block of samples for some value of N. The division of one of the arrays that compose a picture that has three sample arrays or of the array that compose a picture in monochrome format or a picture that is coded using three separate colour planes into coding tree blocks is a partitioning.

A coding tree unit (CTU) a coding tree block of luma samples, two corresponding coding tree blocks of chroma samples of a picture that has three sample arrays, or a coding tree block of samples of a monochrome picture or a picture that is coded using three separate colour planes and syntax structures used to code the samples. The division of a slice into coding tree units is a partitioning.

A coding unit (CU) is a coding block of luma samples, two corresponding coding blocks of chroma samples of a picture that has three sample arrays, or a coding block of samples of a monochrome picture or a picture that is coded using three separate colour planes and syntax structures used to code the samples. The division of a coding tree unit into coding units is a partitioning.

Prediction is defined as an embodiment of the prediction process.

A prediction block is a rectangular M×N block on which the same prediction is applied. The division of a coding block into prediction blocks is a partitioning.

A prediction process is the use of a predictor to provide an estimate of the data element (e.g. sample value or motion vector) currently being decoded.

A prediction unit (PU) is a prediction block of luma samples, two corresponding prediction blocks of chroma samples of a picture that has three sample arrays, or a prediction block of samples of a monochrome picture or a picture that is coded using three separate colour planes and syntax structures used to predict the prediction block samples.

A predictor is a combination of specified values or previously decoded data elements (e.g. sample value or motion vector) used in the decoding process of subsequent data elements.

A tile is an integer number of coding tree blocks co-occurring in one column and one row, ordered consecutively in coding tree block raster scan of the tile. The division of each picture into tiles is a partitioning. Tiles in a picture are ordered consecutively in tile raster scan of the picture.

A tile scan is a specific sequential ordering of coding tree blocks partitioning a picture. The tile scan order traverses the coding tree blocks in coding tree block raster scan within a tile and traverses tiles in tile raster scan within a picture. Although a slice contains coding tree blocks that are consecutive in coding tree block raster scan of a tile, these coding tree blocks are not necessarily consecutive in coding tree block raster scan of the picture.

A slice is an integer number of coding tree blocks ordered consecutively in the tile scan. The division of each picture into slices is a partitioning. The coding tree block addresses are derived from the first coding tree block address in a slice (as represented in the slice header).

A B slice or a bi-predictive slice is a slice that may be decoded using intra prediction or inter prediction using at most two motion vectors and reference indices to predict the sample values of each block.

A P slice or a predictive slice is a slice that may be decoded using intra prediction or inter prediction using at most one motion vector and reference index to predict the sample values of each block.

A reference picture list is a list of reference pictures that is used for uni-prediction of a P or B slice. For the decoding process of a P slice, there is one reference picture list. For the decoding process of a B slice, there are two reference picture lists (list 0 and list 1).

A reference picture list 0 is a reference picture list used for inter prediction of a P or B slice. All inter prediction used for P slices uses reference picture list 0. Reference picture list 0 is one of two reference picture lists used for bi-prediction for a B slice, with the other being reference picture list 1.

A reference picture list 1 is a reference picture list used for bi-prediction of a B slice. Reference picture list 1 is one of two reference picture lists used for bi-prediction for a B slice, with the other being reference picture list 0.

A reference index is an index into a reference picture list.

A picture order count (POC) is a variable that is associated with each picture that indicates the position of the associated picture in output order relative to the output order positions of the other pictures in the same coded video sequence.

A long-term reference picture is a picture that is marked as "used for long-term reference".

To exploit the temporal correlation in a video sequence, a picture is first partitioned into smaller collection of pixels. In HEVC this collection of pixels is referred to as a prediction unit. A video encoder then performs a search in previously transmitted pictures for a collection of pixels which is closest to the current prediction unit under consideration. The encoder instructs the decoder to use this closest collection of pixels as an initial estimate for the current prediction unit. It may then transmit residue information to improve this estimate. The instruction to use an initial estimate is conveyed to the decoder by means of a signal that contains a pointer to this collection of pixels in the reference picture. More specifically, the pointer information contains an index into a list of reference pictures which is called the reference index and the spatial displacement vector (or motion vector) with respect to the current prediction unit. In some examples, the spatial displacement vector is not an integer value, and as such, the initial estimate corresponds to a representation of the collection of pixels.

To achieve better compression efficiency an encoder may alternatively identify two collections of pixels in one or more reference pictures and instruct the decoder to use a linear combination of the two collections of pixels as an initial estimate of the current prediction unit. An encoder will then need to transmit two corresponding pointers to the decoders each containing a reference index into a list and a motion vector. In general a linear combination of one or more collections of pixels in previously decoded pictures is used to exploit the temporal correlation in a video sequence.

When one temporal collection of pixels is used to obtain the initial estimate we refer to the estimation process as uni-prediction. Whereas, when two temporal collections of pixels are used to obtain the initial estimate we refer to the estimation process as bi-prediction. To distinguish between the uni-prediction and bi-prediction case an encoder transmits an indicator to the decoder. In HEVC this indicator is called the inter-prediction mode. Using this motion information a decoder may construct an initial estimate of the prediction unit under consideration.

To summarize, the motion information assigned to each prediction unit within HEVC consists of the following three pieces of information:
  the inter-prediction mode
  the reference indices (for list 0 and/or list 1). In an example, list 0 is a first list of reference pictures, and list 0 is a second list of reference pictures, which may have a same combination or a different combination of values than the first list.
  the motion vector (for list 0 and/or list 1)

It is desirable to communicate this motion information to the decoder using a small number of bits. It is often observed that motion information carried by prediction units are spatially correlated, i.e. a prediction unit will carry the same or similar motion information as the spatially neighboring prediction units. For example a large object like a bus undergoing translational motion within a video sequence and spanning across several prediction units in a picture/frame will typically contain several prediction units carrying the same motion information. This type of correlation is also observed in co-located prediction units of previously decoded pictures. Often it is bit-efficient for the encoder to instruct the decoder to copy the motion information from one of these spatial or temporal neighbors. In HEVC, this process of copying motion information may be referred to as the merge mode of signaling motion information.

At other times the motion vector may be spatially and/or temporally correlated but there exists pictures other than the ones pointed to by the spatial/temporal neighbors which carry higher quality pixel reconstructions corresponding to the prediction unit under consideration. In such an event, the encoder explicitly signals all the motion information except the motion vector information to the decoder. For signaling the motion vector information, the encoder instructs the decoder to use one of the neighboring spatial/temporal motion vectors as an initial estimate and then sends a refinement motion vector delta to the decoder.

In summary, for bit efficiency HEVC uses two possible signaling modes for motion information:
  Merge Mode
  Explicit signaling along with advanced motion vector Skip Mode (or Coding Unit Level Merge Mode)

At the coding unit level a merge flag is transmitted in the bitstream to indicate that the signaling mechanism used for motion information is based on the merging process. In the merge mode a list of up to five candidates is constructed. The first set of candidates is constructed using spatial and temporal neighbors. The spatial and temporal candidates are followed by various bi-directional combinations of the candidates added so far. Zero motion vector candidates are then added following the bi-directional motion information. Each of the five candidates contains all the three pieces of motion information required by a prediction unit: inter-prediction mode, reference indices and motion vector. If the merge flag is true a merge index is signaled to indicate which candidate motion information from the merge list is to be used by all the prediction units within the coding unit.

Merge Mode

At the prediction unit level a merge flag is transmitted in the bitstream to indicate that the signaling mechanism used for motion information is based on the merging process. If the merge flag is true a merge index into the merge list is signaled for a prediction unit using the merge mode. This merge index uniquely identifies the motion information to be used for the prediction unit.

Explicit Signaling Along with Advanced Motion Vector Prediction Mode (AMVP)

When the merge flag is false a prediction unit may explicitly receives the inter-prediction mode and reference indices in the bitstream. In some cases, the inter-prediction mode may not be received and inferred based on data received earlier in the bitstream, for example based on slice type. Following this a list of two motion vectors predictors (MVP list) may be constructed using spatial, temporal and possibly zero motion vectors. An index into this list identifies the predictor to use. In addition the prediction unit receives a motion vector delta. The sum of the predictor identified using the index into MVP list and the received motion vector delta (also called motion vector difference) gives the motion vector associated with the prediction unit.

Scalable video coding is known. In scalable video coding, a primary bit stream (called the base layer bitstream) is received by a decoder. In addition, the decoder may receive one or more secondary bitstream(s) (called enhancement layer bitstreams(s)). The function of each enhancement layer bitstream may be: to improve the quality of the base layer bitstream; to improve the frame rate of the base layer bitstream; or to improve the pixel resolution of the base layer bitstream. Quality scalability is also referred to as Signal-to-Noise Ratio (SNR) scalability. Frame rate scalability is also referred to as temporal scalability. Resolution scalability is also referred to as spatial scalability.

Enhancement layer bitstream(s) can change other features of the base layer bitstream. For example, an enhancement layer bitstream can be associated with a different aspect ratio and/or viewing angle than the base layer bitstream. Another aspect of enhancement layer bitstreams is that it is also possible that the base layer bitstream and an enhancement layer bitstream correspond to different video coding standards, e.g. the base layer bitstream may be coded according to a first video coding standard and an enhancement layer bitstream may be coded according to a second different video coding standard.

An ordering may be defined between layers. For example:
  Base layer (lowest) [layer 0]
  Enhancement layer 0 [layer 1]
  Enhancement layer 1 [layer 2]
  . . .
  Enhancement layer n (highest) [layer n+1]

The enhancement layer(s) may have dependency on one another (in an addition to the base layer). In an example, enhancement layer 2 is usable only if at least a portion of enhancement layer 1 has been parsed and/or reconstructed successfully (and if at least a portion of the base layer has been parsed and/or reconstructed successfully).

FIG. 1A illustrates a decoding process for a scalable video decoder with two enhancement layers. A base layer decoder outputs decoded base layer pictures. The base layer decoder also provides metadata, e.g. motion vectors, and/or picture data, e.g. pixel data, to inter layer processing 0. Inter layer processing 0 provides an inter layer prediction to the enhancement layer 0 decoder, which in turn outputs decoded enhancement layer 0 pictures. In an example, the decoded enhancement layer 0 pictures have a quality improvement with respect to decoded base layer pictures. Enhancement layer 0 decoder also provides metadata and/or picture data to inter layer processing 1. Inter layer processing 1 provides an inter layer prediction to the enhancement layer 1 decoder, which in turn outputs decoded enhancement layer 1 pictures. In an example, decoded enhancement layer 1 pictures have increased spatial resolution as compared to decoded enhancement layer 0 pictures.

Prediction may be by uni-prediction or bi-prediction—in the later case there will be two reference indexes and a motion vector for each reference index. FIG. 1B illustrates uni-prediction according to HEVC, whereas FIG. 1C illustrates bi-prediction according to HEVC.

Transmission of the motion information to a decoder, e.g. transmission of the motion information over a network to the decoder, according to known schemes consumes bandwidth, e.g. network bandwidth. The bandwidth consumed by transmission of motion information according to these known schemes is too high for some applications. The disclosure that follows solves this and other problems.

DETAILED DESCRIPTION

Figure 1A:
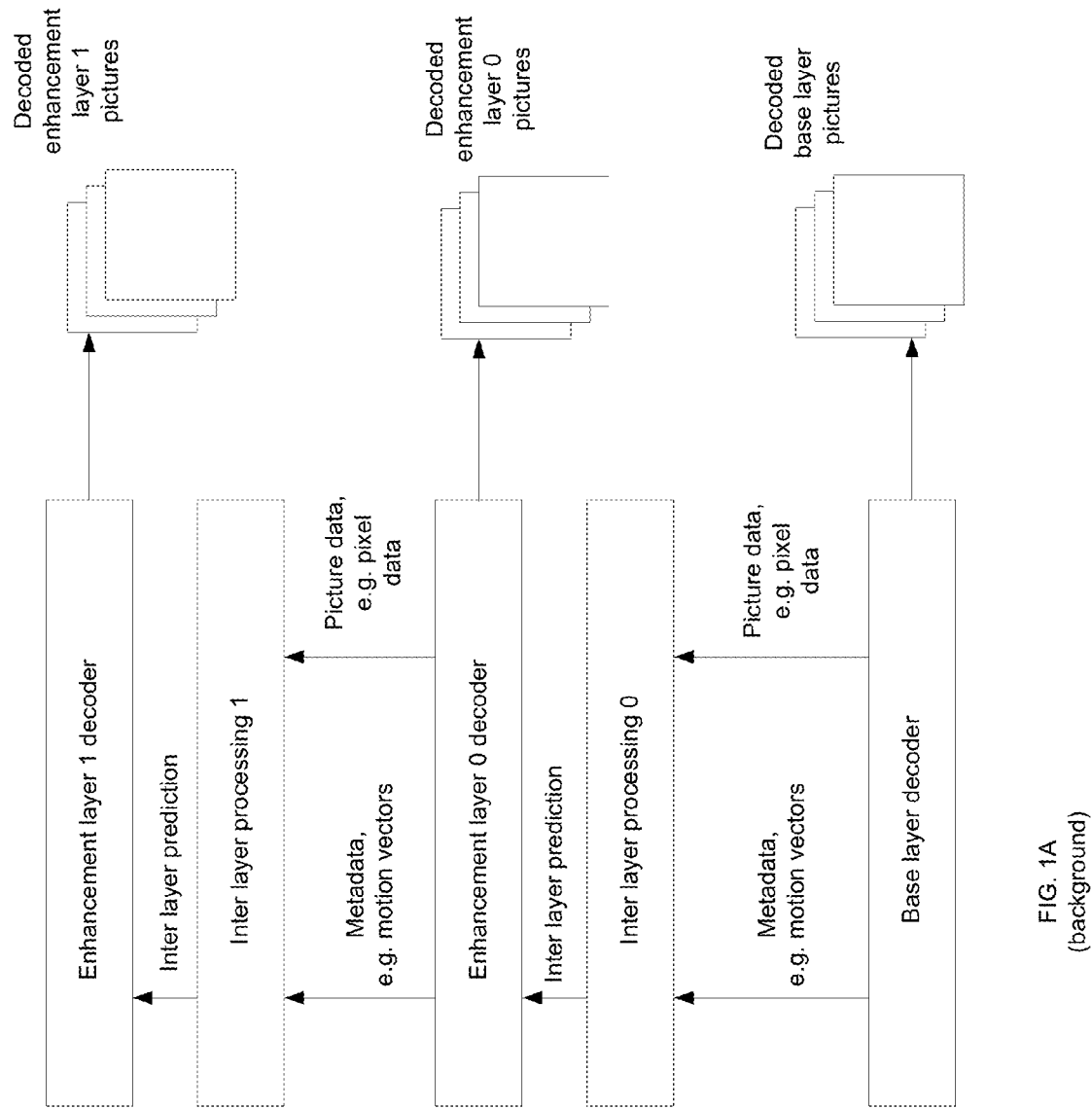
FIG. 1A is a block diagram of a scalable decoder.
Figure 1B:
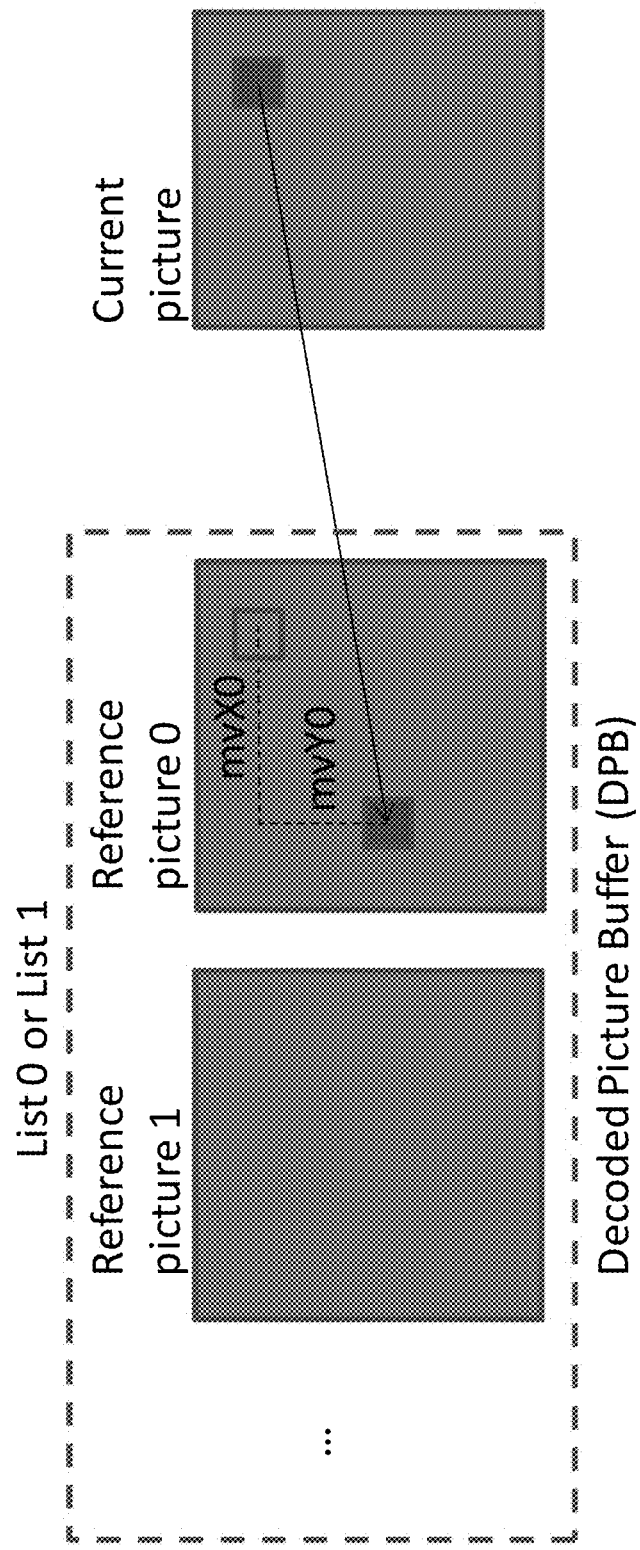
FIG. 1B illustrates uni-prediction according to HEVC.
Figure 1C:
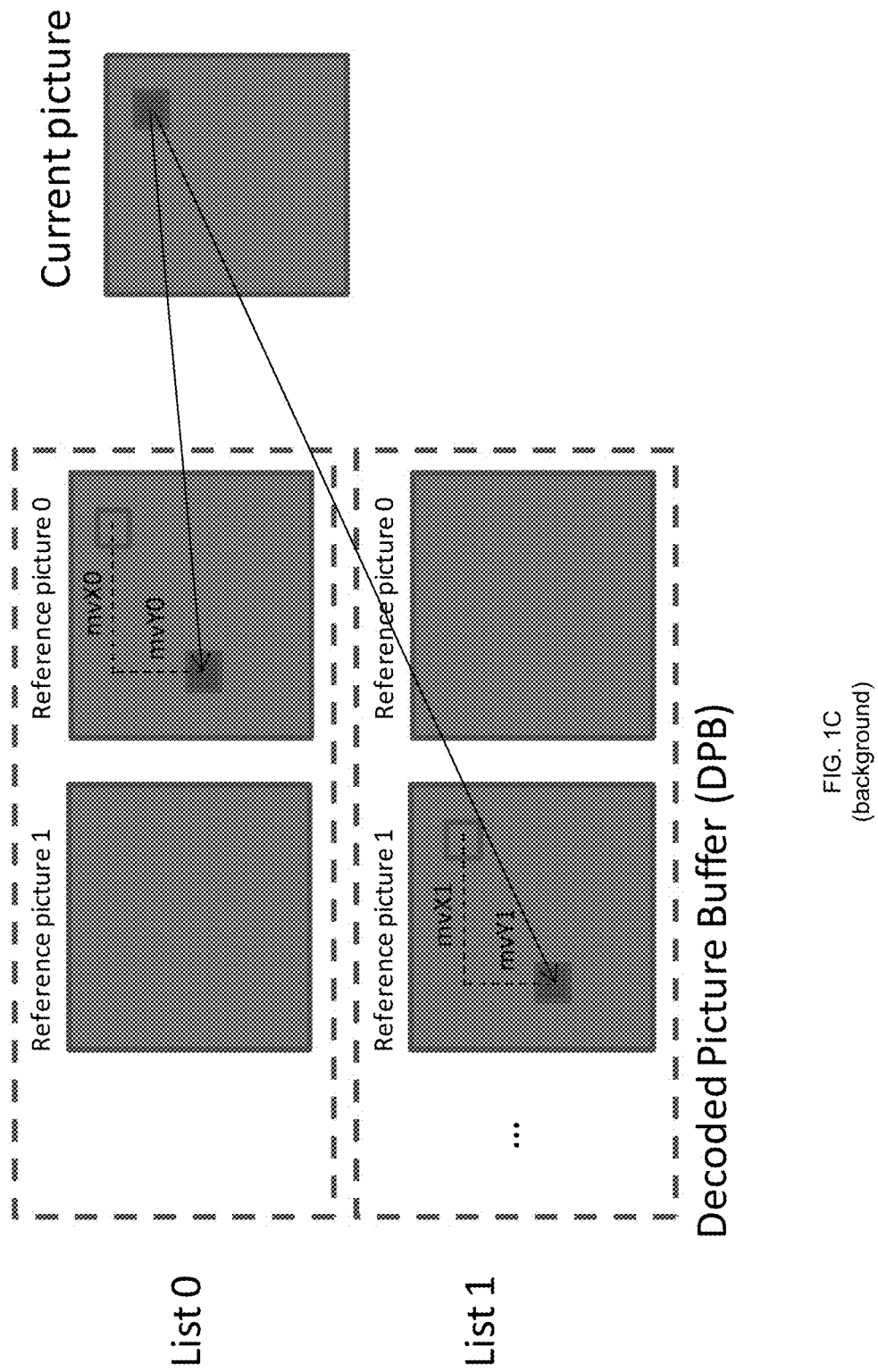
FIG. 1C illustrates bi-prediction according to HEVC.
Figure 2:
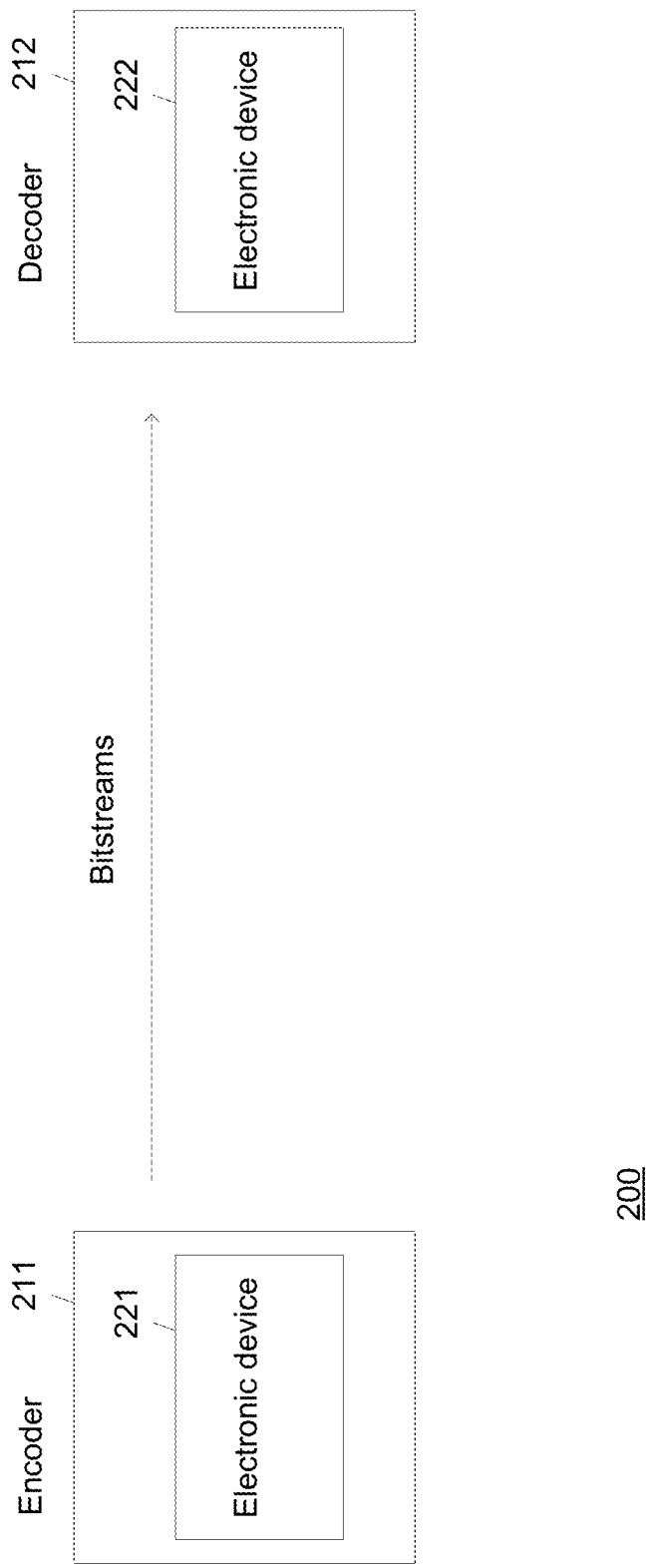
FIG. 2 is a block diagram illustrating an example of an encoder and a decoder.

FIG. 2 is a block diagram illustrating an example of an encoder and a decoder.

The system 200 includes an encoder 211 to generate bitstreams to be decoded by a decoder 212. The encoder 211 and the decoder 212 may communicate, for example, over a network.

The decoder 212 includes an electronic device 222 configured to decode using some or all of the processes described with reference to the flow diagrams. The electronic device 222 may comprise a processor and memory in electronic communication with the processor, where the memory stores instructions being executable to perform the operations shown in the flow diagrams. The encoder 211 includes an electronic device 221 configured to encode video data to be decoded by the decoder 212.

The electronic device 222 may be configured to receive a first layer bitstream and a second enhancement layer bitstream corresponding to the first layer bitstream. The electronic device 222 may be configured to derive a motion vector at the second layer representation from the first layer representation. In an example, the derived motion vector may be used to recover the second layer representation responsive to a control signal, e.g. a flag, transmitted in the second layer bitstream. In an example, the derived motion vector may be added to a candidate list, and a control signal transmitted in the second layer bitstream may identify a candidate from the candidate list to be used to recover the second layer representation. In an example, a difference corresponding to the derived motion vector is signaled in the second layer bitstream, and the signaled difference may be used with the derived motion vector to recover the second layer representation.

Figure 3A:
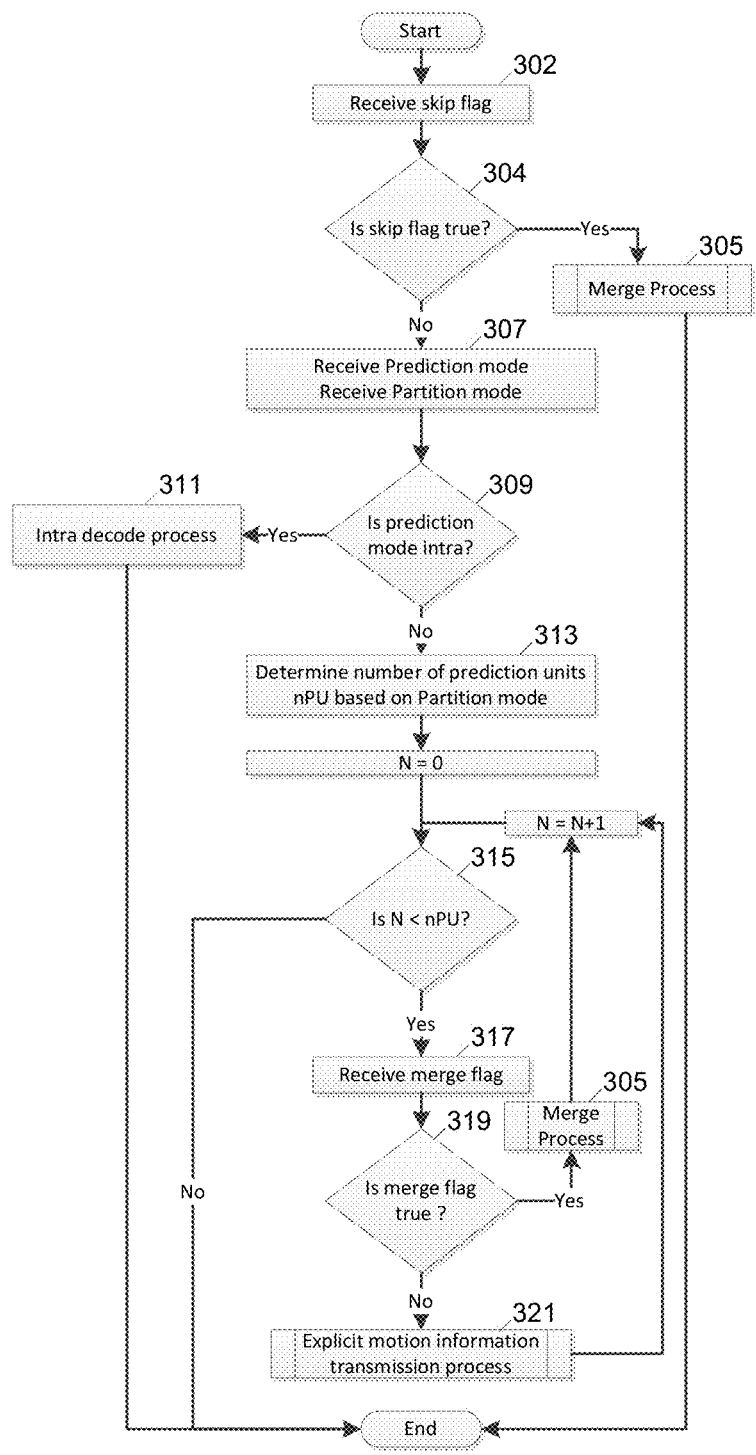
FIG. 3A is a flow diagram illustrating one configuration of a method for determining a mode for signaling motion information on an electronic device.

FIG. 3A is a flow diagram illustrating one configuration of a method for determining a mode for signaling motion information on an electronic device.

In process 302, the electronic device 222 receives a skip flag, and in process 304 determines whether the skip flag is true. Skip flags are transmitted for coding units (CUs). The skip flag signals to copy motion information for a neighbor to skip a transmission of motion information for the CU. If the skip flag is true, then in process 305 the electronic device 222 performs the merge process for the CU (the merge process will be discussed in more detail with respect to FIG. 3B).

Still referring to FIG. 3A, in process 307 the electronic device 222 receives a prediction mode flag and a partition mode flag. These flags are transmitted for prediction units (PUs), which are components of the CU. In process 309, the electronic device 222 determines whether the prediction mode is intra. If the prediction mode is intra, then in process 311 the electronic device 222 performs intra decoding (no motion information is transmitted).

If the prediction mode is not intra, e.g. prediction mode is inter, then in process 313 the electronic device 222 determines the number (n) of prediction units (PUs), i.e. nPUs (motion information may be transmitted in a plurality of units, namely PUs). Starting at N equals 0, the electronic device 222 in process 315 determines whether N less than nPU. If N is less than nPU, then in process 317 the electronic device 222 receives a merge flag. In process 319, the electronic device 222 determines whether the merge flag is true. If the merge flag is true, then in the electronic device 222 performs the merge process 305 for the PU (again, the merge process will be discussed in more detail with respect to FIG. 3B).

Still referring to FIG. 3A, if the merge flag is not true, then in process 321 the electronic device 222 performs an explicit motion information transmission process for the PU (such process will be discussed in more detail with respect to FIG. 3C). The process of FIG. 3A repeats as shown for a different N value.

Figure 3B:
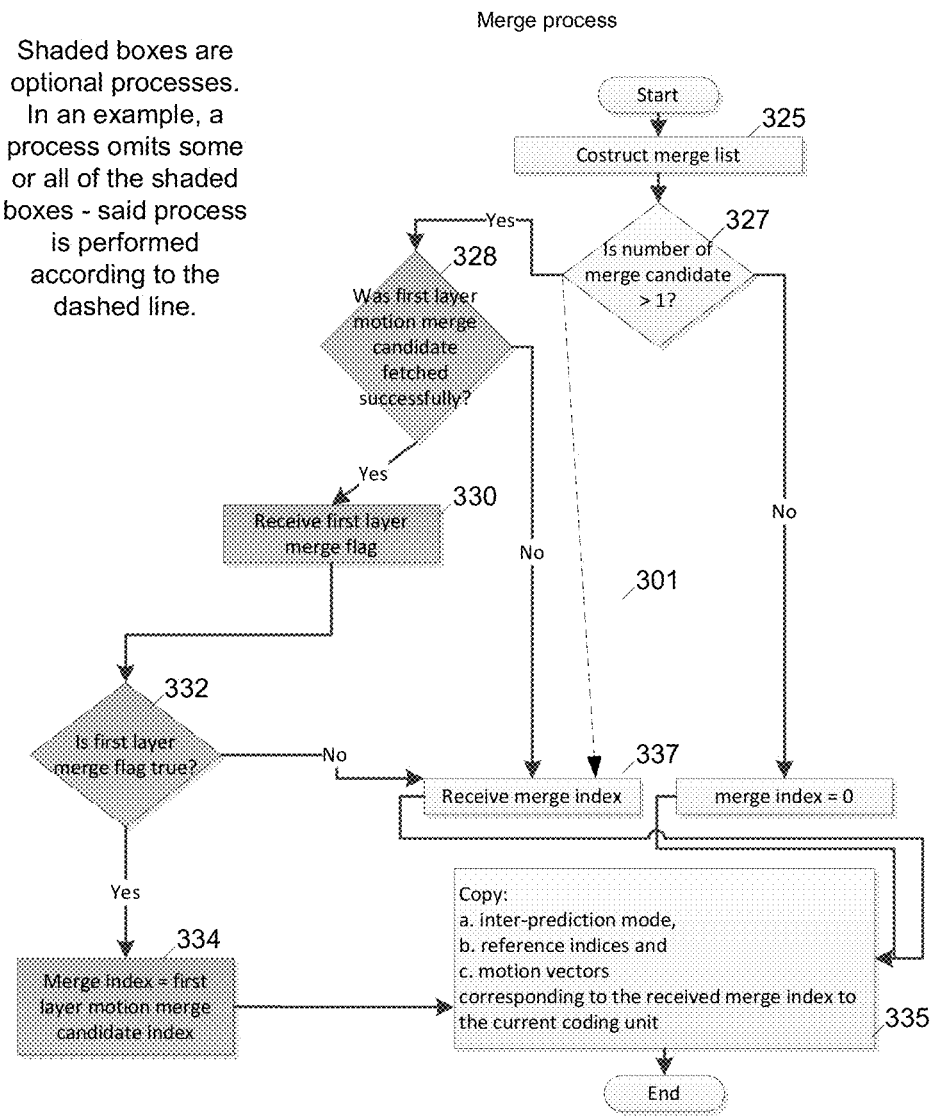
FIG. 3B is a flow diagram illustrating one configuration of a merge process on an electronic device.

FIG. 3B is a flow diagram illustrating one configuration of a merge process on an electronic device.

The electronic device 222 in process 325 constructs a merge list (merge list construction will be discussed in more detail with respect to FIGS. 4A-B). Still referring to FIG. 3B, in process 327, the electronic device 222 determines whether a number of merge candidates is greater than 1. If the number is not greater than 1, then the merge index equals 0. The electronic device 222 in process 335 copies, for the current unit, information (such as the inter-prediction mode [indicating whether uni-prediction or bi-prediction and which list], at least one reference index, and at least one motion vector) for the candidate corresponding to merge index equals 0.

If the number of merge candidates is greater than 1, in an example, the electronic device 222 may be configured to perform some or all of processes 328, 330, 332, and 334 indicated by the shaded boxes and/or diamonds. However, in some examples the electronic device 222 is not configured with processes 328, 330, 332, and 334 (in such examples processing continues directly from process 327 [yes result] to process 337 along dashed line 301). A process including some or all of the shaded boxes and/or diamonds may use reduced bandwidth for transmissions to the decoder 212 as compared to a process following the dashed line 301. The optional processes 328, 330, 332, and 334 will be described in more detail later in the section entitled "Merge candidate using first layer motion information".

The electronic device 222 in process 337 receives the merge index. The electronic device 222 in process 335 copies, for the current unit, information (such as the inter-prediction mode, at least one reference index, and at least one motion vector) for the candidate corresponding to the received merge index.

Figure 3C:
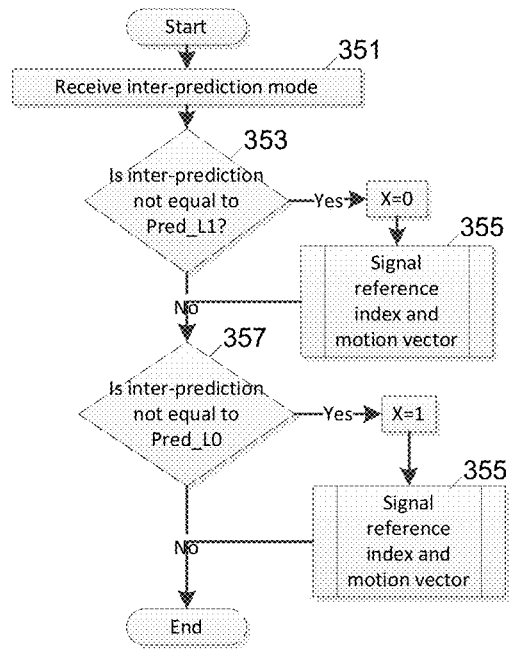
FIG. 3C is a flow diagram illustrating one configuration of an explicit motion information transmission process on an electronic device.

FIG. 3C is a flow diagram illustrating one configuration of an explicit motion information transmission process on an electronic device.

The electronic device 222 in process 351 receives an inter-prediction mode (again indicating whether uni-prediction or bi-prediction and which list). If the inter-prediction mode indicates that the current PU does not point to list 1, i.e. does not equal Pred_L1, then X equals 0 and the electronic device 222 in process 355 signals reference index and motion vector (such process will be discussed in more detail with respect to FIG. 3D).

Still referring to FIG. 3C, otherwise the electronic device 222 in process 357 determines whether inter-prediction mode indicates that the current PU does not point to list 0, i.e. does not equal Pred_L0, then X equals 1 and the electronic device 222 in process 355 signals reference index and motion vector (such process will be discussed in more detail with respect to FIG. 3D).

Figure 3D:
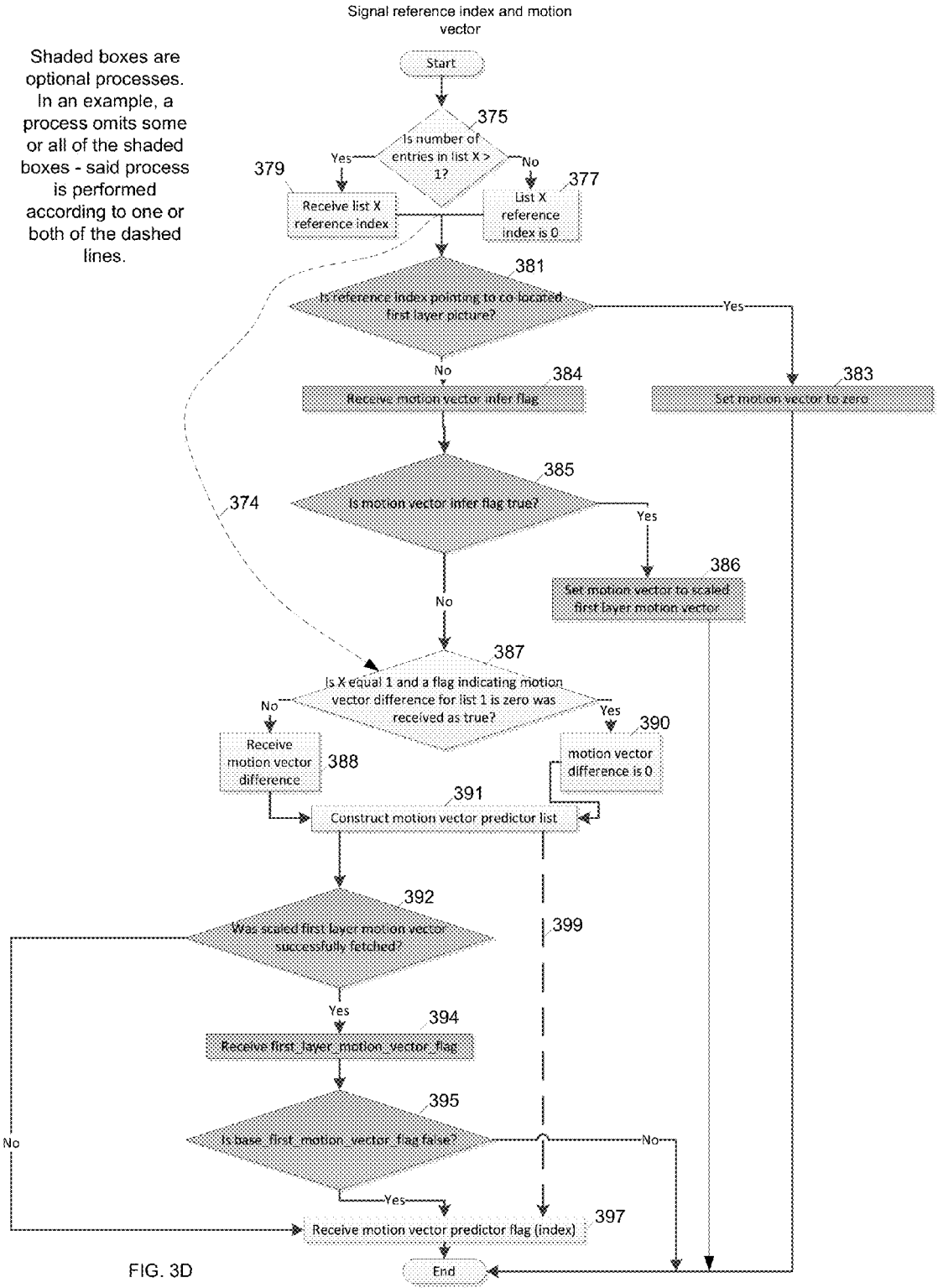
FIG. 3D is a flow diagram illustrating one configuration of signaling a reference index and a motion vector on an electronic device.

FIG. 3D is a flow diagram illustrating one configuration of signaling a reference index and a motion vector on an electronic device.

The electronic device 222 in process 375 determines whether the number of entries in list X greater than 1. If the number of entries in list X is greater than 1, then in process 379 the electronic device 222 receives a list X reference index. If the number of entries in list X is not greater than 1, then in process 377 the list X reference index is equal to 0.

In an example, the electronic device 222 may be configured to perform some or all of processes 381, 383, 384, 385, and 386 indicated by the shaded boxes and/or diamonds. However, in some examples the electronic device 222 is not configured with processes 381, 383, 384, 385, and 386 (in such examples processing continues directly from process 377/379 to process 387 along dashed line 374). A process including some or all of the shaded boxes and/or diamonds may use reduced bandwidth for transmissions to the decoder 212 as compared to a process following the dashed line 374. The optional processes 381, 383, 384, 385, and 386 will be described in more detail later in the section entitled "Motion vector inference from first layer".

The electronic device 222 determines in process 387 whether X is equal to 1 and, if so, whether a motion vector difference flag (indicating whether motion vector difference is zero) for list 1 is true. If the flag is not true, then the electronic device 222 in process 388 receives the motion vector difference. If the flag is true, then in process 390 the motion vector difference is zero. The electronic device 222 in process 391 constructs a motion vector predictor list (motion vector predictor list construction will be discussed in more detail with reference to FIGS. 6A-C).

Still referring to FIG. 3D, in an example, the electronic device 222 may be configured to perform some or all of processes 392, 394, and 395 indicated by the shaded boxes and/or diamonds. However, in some examples the electronic device 222 is not configured with processes 392, 394, and 395 (in such examples processing continues directly from process 391 to process 397 along the dashed line 399). A process including some or all of the shaded boxes and/or diamonds may use reduced bandwidth for transmissions to the decoder 212 as compared to a process following the dashed line 399. The optional processes 392, 394, and 395 will be described in more detail later in the section entitled "Adding scaled first layer motion vector to the MVP list".

The electronic device 222 in process 397 receives a motion vector predictor flag.

Figure 4A:
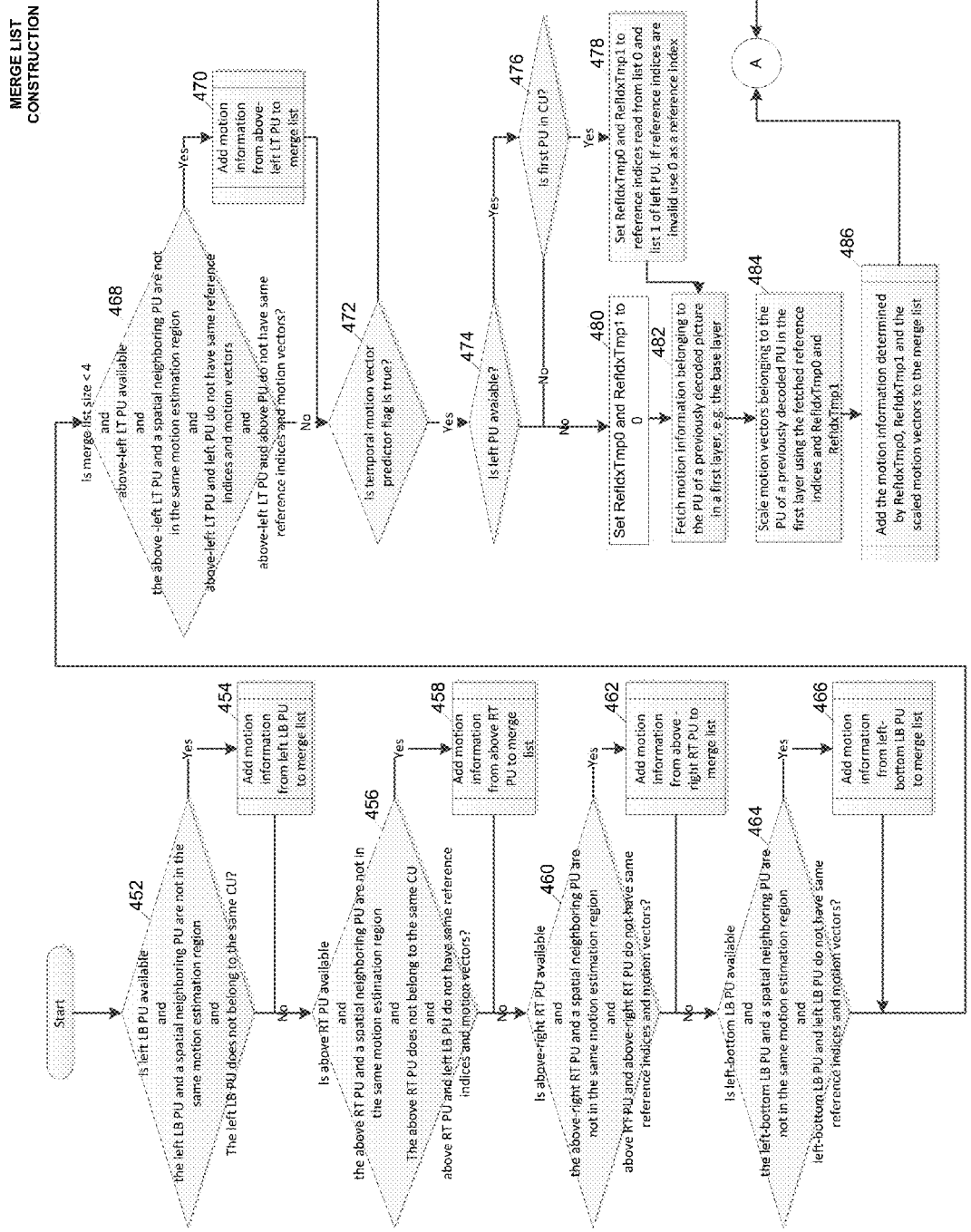
FIG. 4A is a flow diagram illustrating one configuration of merge list construction on an electronic device.

FIG. 4A is a flow diagram illustrating one configuration of merge list construction on an electronic device.

Figure 5:
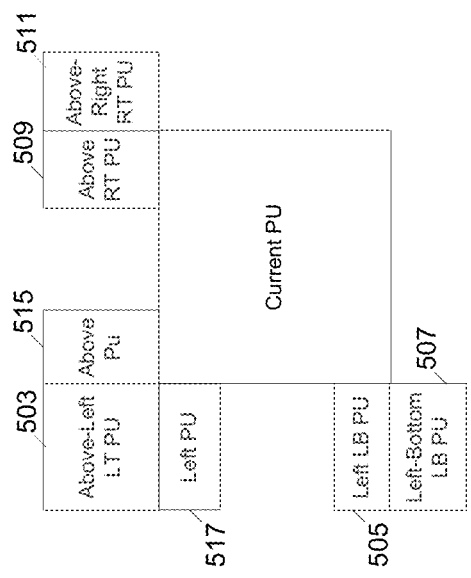
FIG. 5 illustrates a plurality of prediction units.

The electronic device 222 in process 452 determines whether three conditions corresponding to the left LB PU (FIG. 5, 505) are true. The three conditions are: is the left LB PU 505 available; whether the left LB PU 505 and a spatial neighboring PU are not in the same motion estimation region; and whether the left LB PU 505 does not belong to the same CU (as the current PU). One criterion for availability is based on the partitioning of the picture (information of one partition may not be accessible for another partition). Another criterion for availability is inter/intra (if intra, then there is no motion information available). If all three conditions are true, then the electronic device 222 in process 454 adds motion information from the left LB PU 505 to the merge list.

If the three conditions for the left LB PU 505 are not all true, then the electronic device 222 in processes 456, 460, and 464 makes similar determinations for the above RT PU (FIG. 5, 509), the above-right RT PU (FIG. 5, 511), the left-bottom LB PU (FIG. 507), respectively. Note that in process 456 the electronic device 222 determines a fourth condition—whether the above RT PU 509 and a previously considered PU, i.e. the left LB PU 505, do not have the same reference indices and motion vectors as shown in more detail the figure. Also note that the same-CU condition is not checked in process 460 for above-right RT PU 511 and the same-CU condition is not checked in process 464 for the left-bottom LB PU 507. Additional motion information may be added to the merge list in processes 458, 462, and 466.

The electronic device 222 in process 468 determines whether the merge list size less than 4, and whether four conditions corresponding to the above-left LT PU (FIG. 5, 503) are true. The four conditions are: is the above-left LT PU 503 available; are the above-left LT PU 503 and a spatial neighboring PU not in the same motion estimation region; do the above-left LT PU 503 and a left PU (FIG. 5, 517) not have same reference indices and motion vectors; and do the above-left LT PU 503 and an above PU (FIG. 5, 515) not have the same indices and motion vectors. If the merge list size is less than 4 and all four conditions are true, then the electronic device 222 in process 470 adds motion information for the above-left LT PU 503 to the merge list.

The electronic device 222 in process 472 determines whether a temporal motion vector predictor flag (transmitted in an HEVC bitstream) is true. If the temporal motion vector predictor flag is not true, then the process continues to FIG. 4B as indicated by the letter "A".

If the temporal motion vector predictor flag is true, then the electronic device 222 may construct a candidate using a reference index from a spatial neighbor and a motion vector from a temporal neighbor. The electronic device 222 in process 474 determines whether a left PU 517 is available. If the left PU 517 is available, then the electronic device 222 in process 476 determines whether the left PU 517 is a first, i.e. initial, PU in the CU. If the left PU 517 is the first PU in the CU, then the electronic device 222 in process 478 sets RefIdxTmp0 and RefIdxTmp1 to reference indices read from list 0 and list 1 of left PU 517 (if reference indices are invalid then 0 is used as a reference index).

If the left PU 517 is not available or is available but is not the first PU in the CU, then the electronic device 222 in process 480 sets RefIdxTmp0 and RefIdxTmp1 to 0.

The electronic device 222 in process 482 fetches motion information corresponding to, e.g. belonging to, the PU of a previously decoded picture in a first layer, e.g. the base layer. The electronic device 222 in process 484 scales motion vectors corresponding to, e.g. belonging to, the PU of a previously decoded picture in the first layer using the fetched reference indices and RefIdxTmp0 and RefIdxTmp1. The electronic device 222 in process 486 adds the motion information determined by RefIdxTmp0, RefIdxTmp1, and the called motion vectors to the merge list. In an example, the previously decoded picture in the first layer is a picture temporally co-located, e.g. corresponding to the same time instance, with the current picture being coded. The process continues to FIG. 4B as indicated by the letter "A".

Figure 4B:
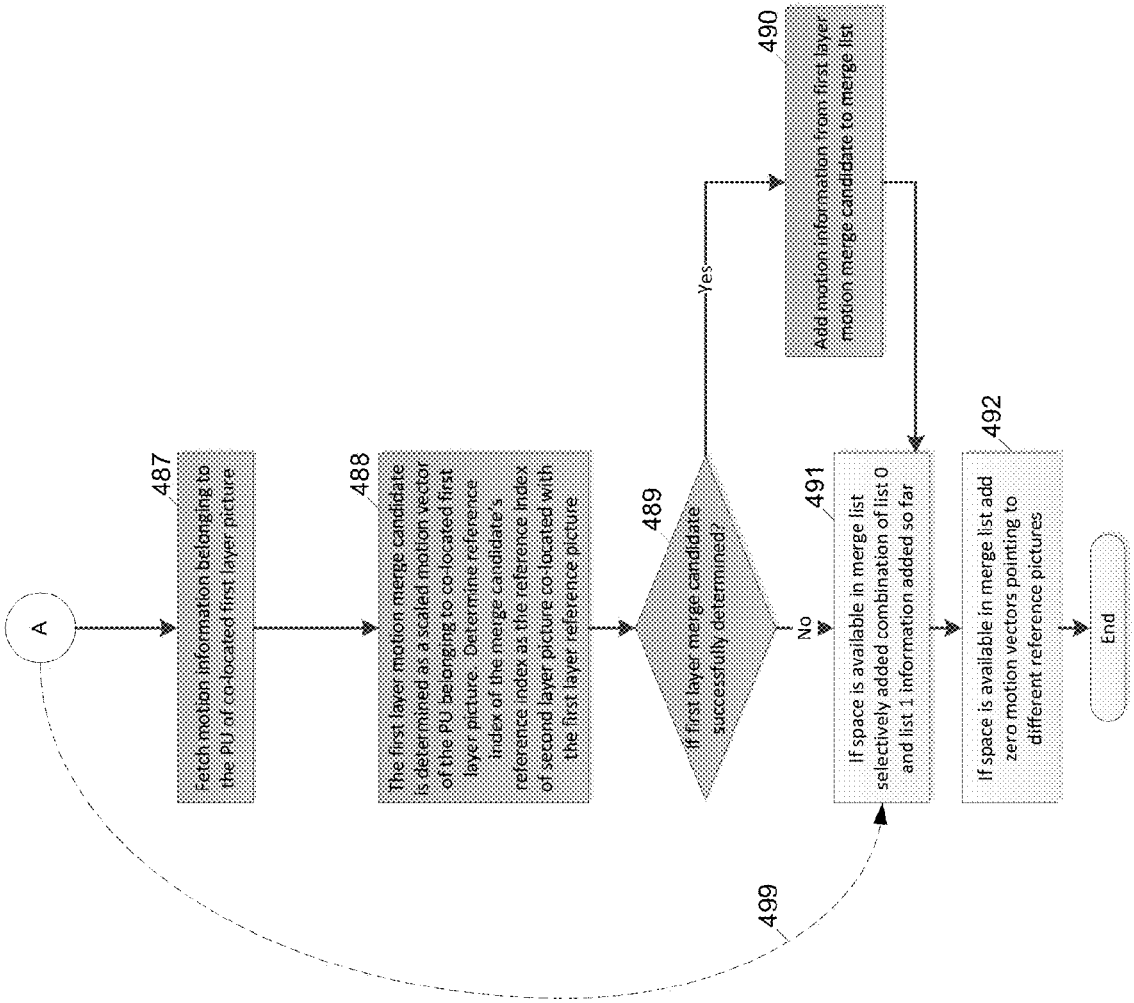
FIG. 4B is a flow diagram illustrating more of the configuration of merge list construction of FIG. 4A.

FIG. 4B is a flow diagram illustrating more of the configuration of merge list construction of FIG. 4A.

In an example, the electronic device 222 may be configured to perform some or all of processes 487, 488, 489, and 490 indicated by the shaded boxes and/or diamonds. However, in some examples the electronic device 222 is not configured with processes 487, 488, 489, and 490 (in such examples processing continues directly from "A" to process 491 along the dashed line 499). A process including some or all of the shaded boxes and/or diamonds may use reduced bandwidth for transmissions to the decoder 212 as compared to a process following the dashed line 499. The optional processes 487, 488, 489, and 490 will be described in more detail later in the section entitled "Merge candidate using first layer motion information".

The electronic device 222 in process 491, if space is available in the merge list, selectively adds bi-directional combinations of the candidates added so far, e.g. known candidates. The electronic device 222 in process 492, if space is available in the merge list, adds zero motion vectors pointing to different reference pictures.

Figure 6A:
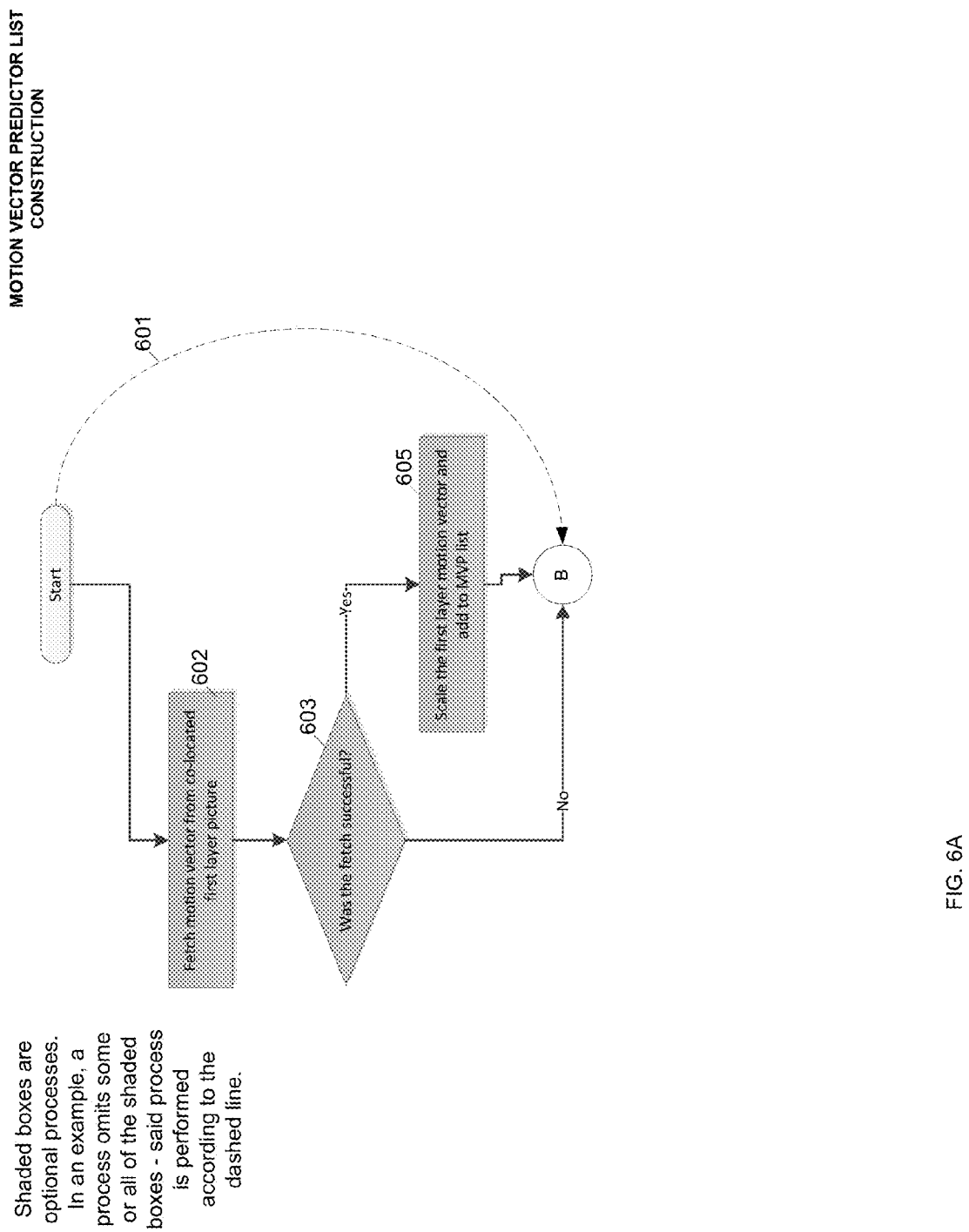
FIG. 6A is a flow diagram illustrating one configuration of motion vector predictor list construction on an electronic device.

FIG. 6A is a flow diagram illustrating one configuration of motion vector predictor list construction on an electronic device.

In an example, the electronic device 222 may be configured to perform some or all of processes 602, 603, and 605 indicated by the shaded boxes and/or diamonds. However, in some examples the electronic device 222 is not configured with processes 602, 603, and 605 (in such examples processing continues directly from start to "B" along the dashed line 601). A process including some or all of the shaded boxes and/or diamonds may use reduced bandwidth for transmissions to the decoder 212 as compared to a process following the dashed line 601. The optional processes 602, 603, and 605 will be described in more detail later in the section entitled "Adding scaled first layer motion vector to the MVP list".

Figure 6B:
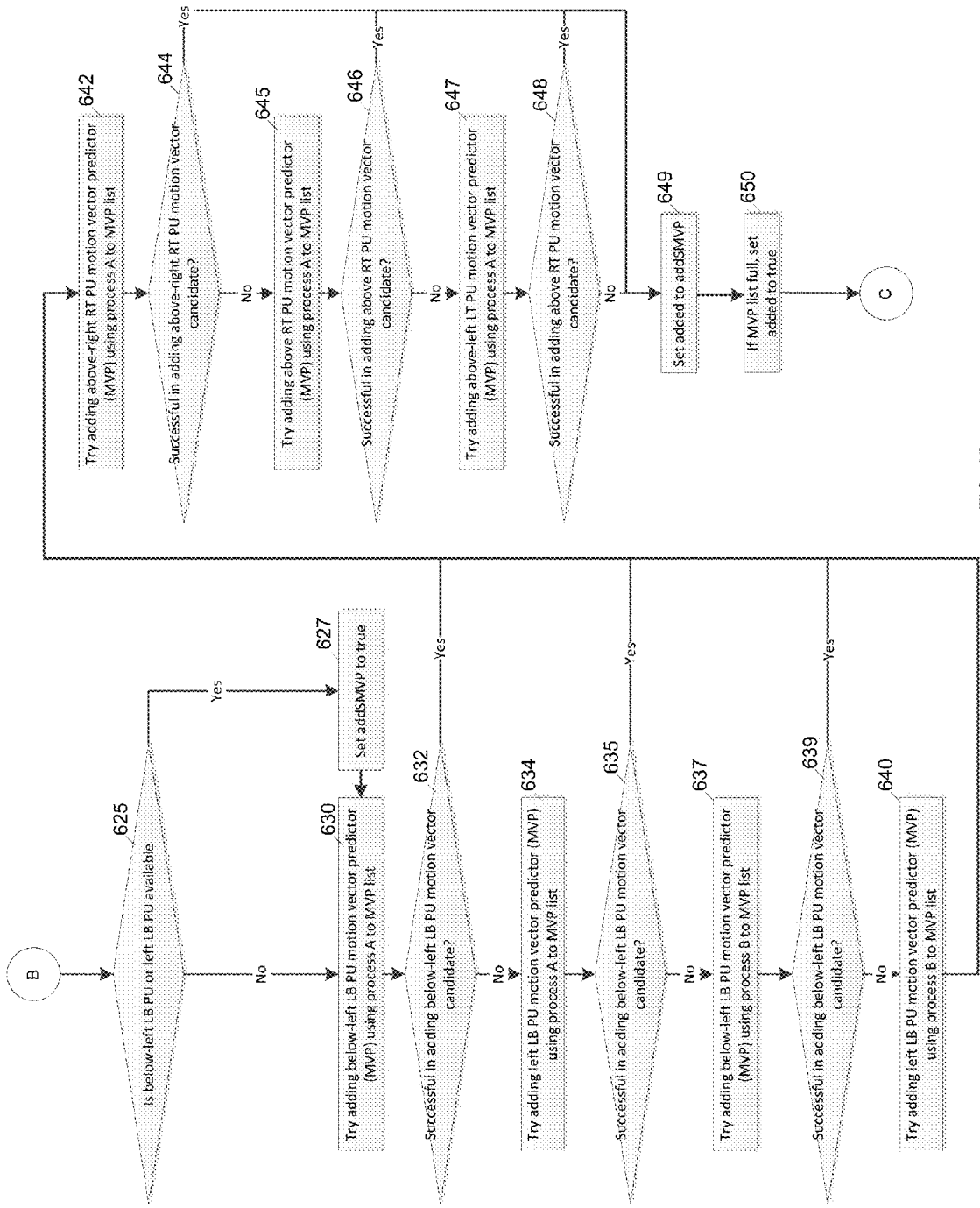
FIG. 6B is a flow diagram illustrating more of the configuration of motion vector predictor list construction of FIG. 6A.

FIG. 6B is a flow diagram illustrating more of the configuration of motion vector predictor list construction of FIG. 6A.

The electronic device 222 in process 625 determines whether at least one of below-left LB PU (not shown) or left LB PU (FIG. 5, 505) is available. The electronic device 222 in process 627 sets a variable addSMVP to true if at least one of such PUs are available.

If neither of such PUs are available, then the electronic device 222 in process 630 tries to add below-left LB PU motion vector predictor (MVP) using process A to MVP list. If not successful, then the electronic device 222 in process 634 tries adding left LB PU MVP using process A to MVP list. If not successful, then the electronic device 222 in process 637 tries adding below-left LB PU MVP using process B to MVP list. If not successful, then the electronic device 222 in process 640 tries adding left LB PU MVP using process B to MVP list. At least one of processes 632, 635, and 639 may be performed.

In an example, process A is configured to add a candidate MVP only if a reference picture of a neighboring PU and that of the current PU (i.e. the PU presently under consideration) is/are the same. In an example, process B is a different process than process A. In an example, process B is configured to scale the motion vector of a neighboring PU based on temporal distance and add the result as a candidate to the MVP list.

Figure 8A:
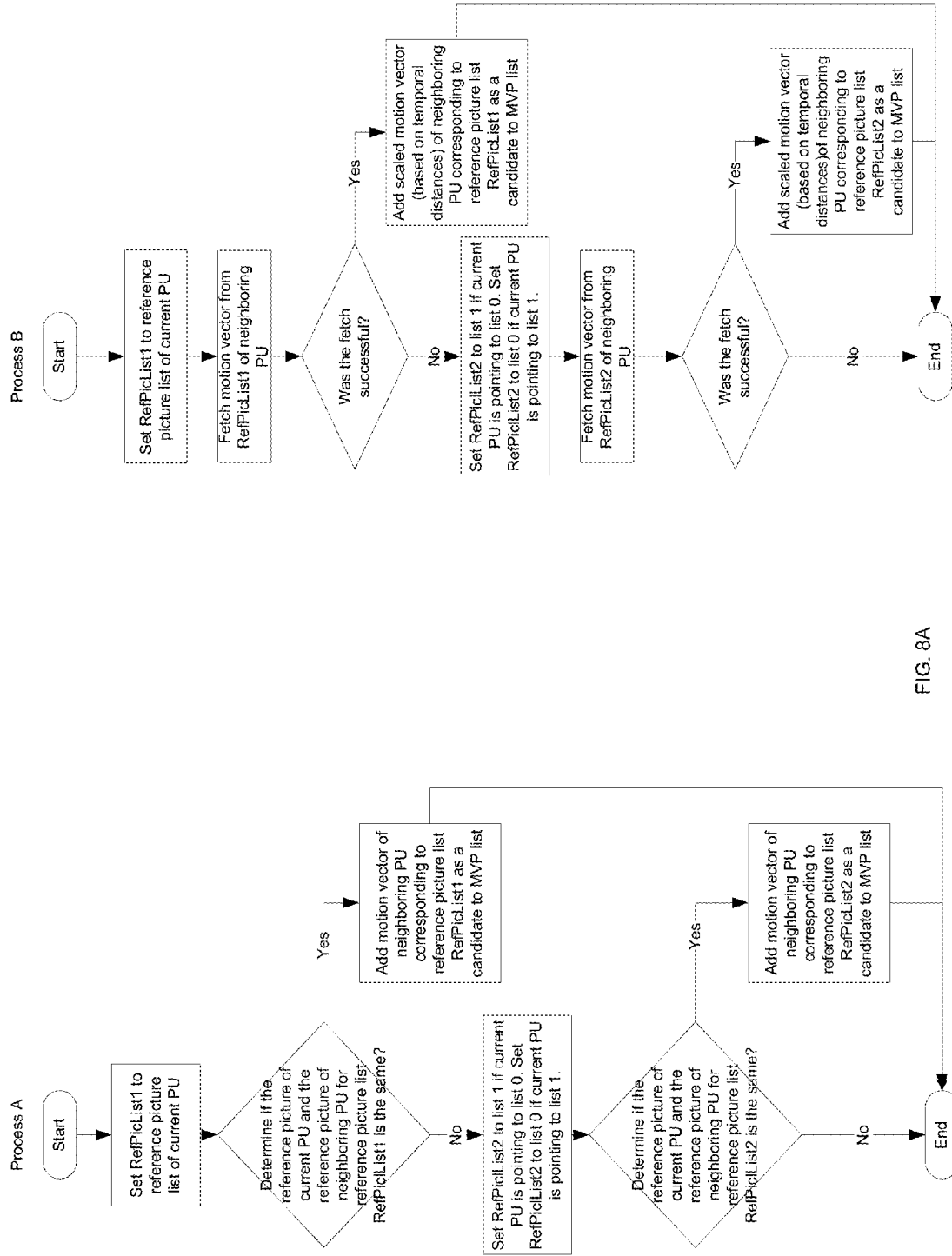
FIG. 8A illustrates flow diagrams illustrating an example of processes A and B that may be used for motion vector predictor list construction (FIGS. 6A-C and 7A-C).
Figure 8B:
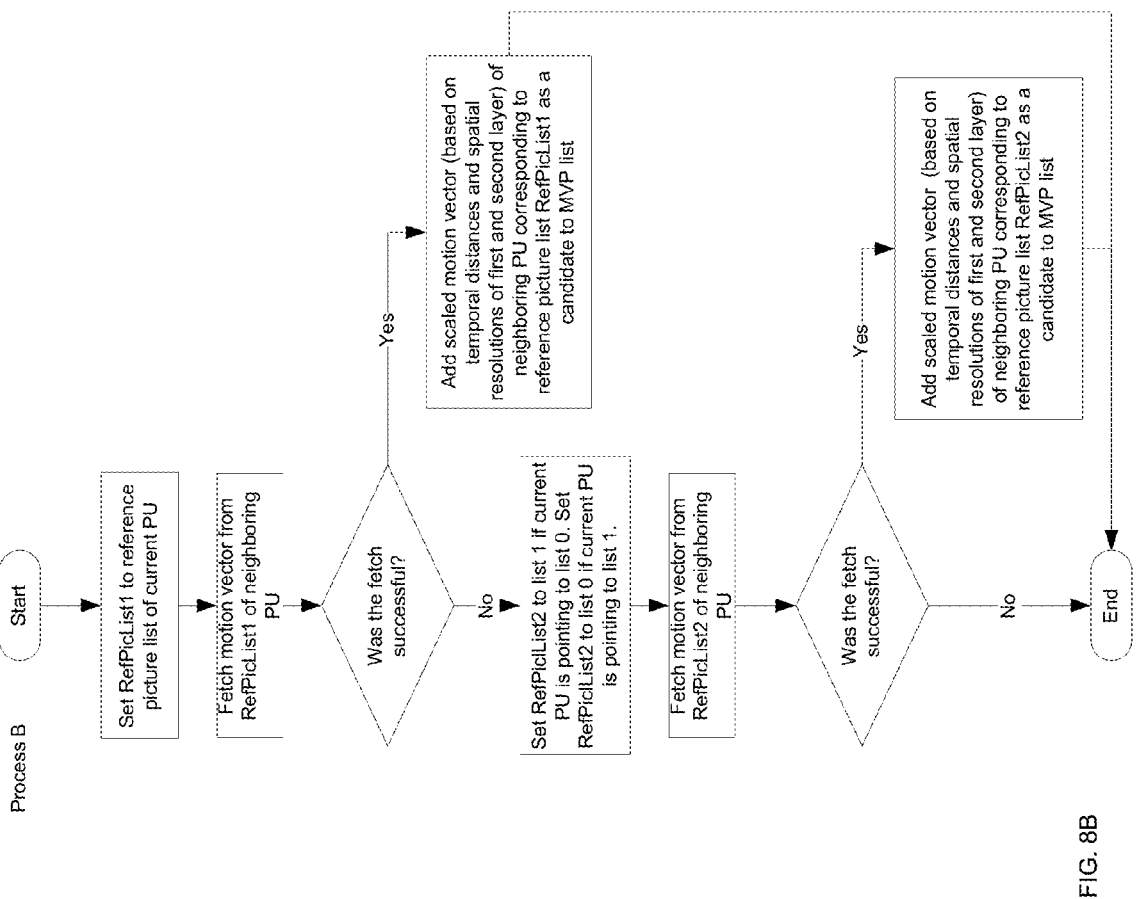
FIG. 8B illustrates another example of process B from FIG. 8A.

In an example, processes A and B operate as shown in FIG. 8A. In an example, process A operates as shown in FIG. 8A and process B operates as shown in FIG. 8B. Process B of FIG. 8B accounts for the change in spatial resolution across layers. In such an event, the scaling of motion vectors is not only based on temporal distance, but also on the spatial resolutions of the first and second layer.

Referring again to FIG. 6B, if the electronic device 222 in process 642 tries to add above-right RT PU MVP using process A to MVP list. If not successful, then the electronic device 222 in process 645 tries adding above RT PU MVP using process A to MVP list. If not successful, then the electronic device 222 in process 647 tries adding above-left LT PU MVP using process A to MVP list. At least one of processes 644, 646, and 648 may be performed.

The electronic device 222 in process 649 sets the value of a variable "added" to the same value as variable "addSMVP". The electronic device 222 in process 650 sets the variable "added" to true if the MVP list is full. The process continues to FIG. 6C as indicated by the letter "C".

Figure 6C:
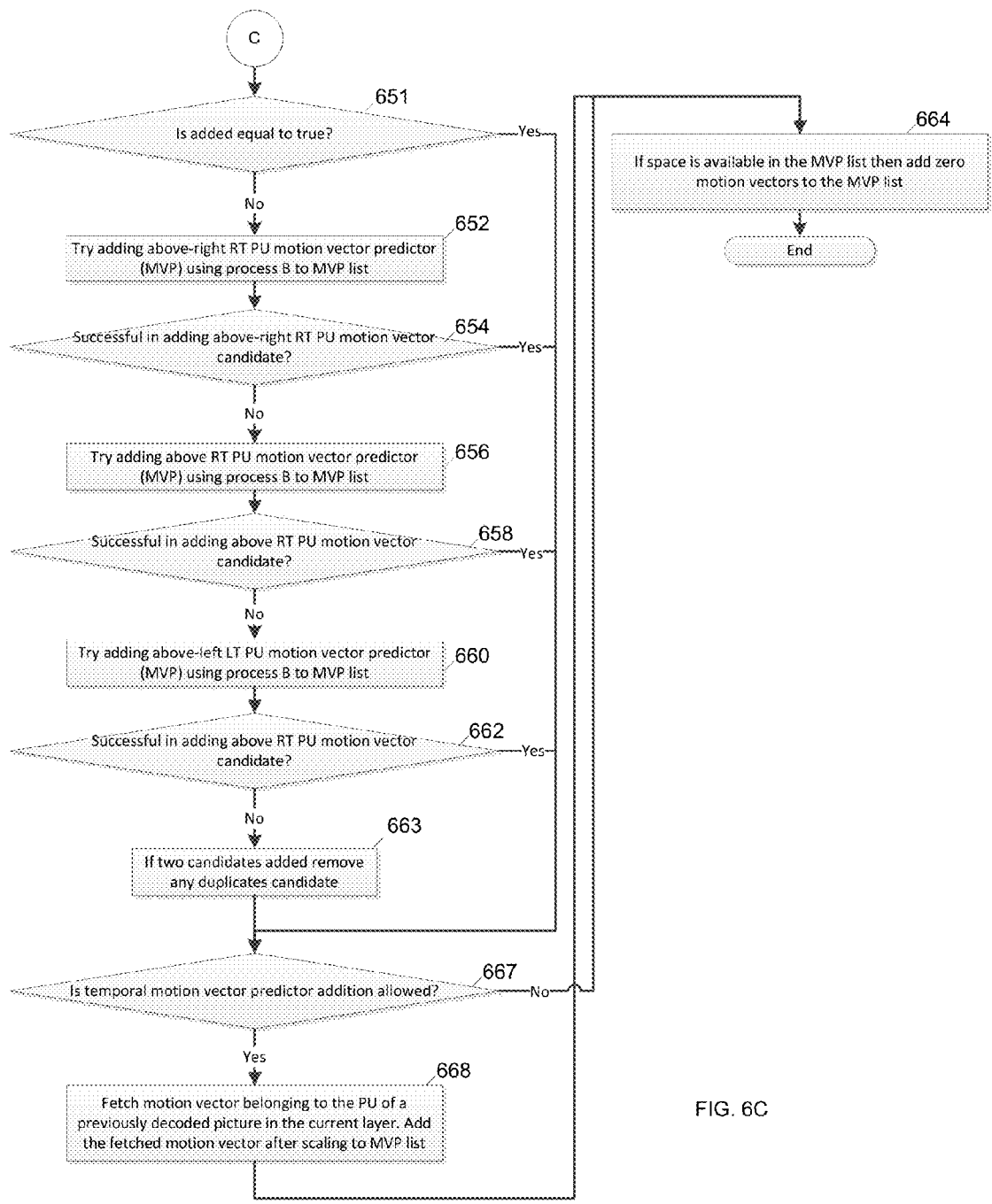
FIG. 6C is a flow diagram illustrating more of the configuration of motion vector predictor list construction of FIG. 6B.

FIG. 6C is a flow diagram illustrating more of the configuration of motion vector predictor list construction of FIG. 6B.

The electronic device 222 in process 651 determines whether left-bottom LB or left LB PU 505 are available, i.e. determines whether the variable "added" is set to true. If not, then in process 652 the electronic device 222 tries adding above-right RT PU MVP using process B to MVP list. If not successful, then the electronic device 222 in process 656 tries adding above RT PU MVP using process B to MVP list. If not successful, then the electronic device 222 in process 660 tries adding the above-left LT PU MVP using process B to MVP list. At least one of processes 654, 658, and 662 may be performed. The electronic device 222 in process 663 may remove any duplicate candidates in the MVP list.

The electronic device 222 in process 667 determines whether temporal motion vector predictor addition is allowed, e.g. determines whether the temporal motion vector predictor flag is true. If allowed, the electronic device 222 in process 668 fetches a motion vector corresponding to, e.g. belonging to, the PU of a previously decoded picture in the current layer and adds the fetched motion vector after scaling to MVP list. The electronic device 222 in process 664, if space is available in the MVP list, adds zero motion vectors to the MVP list.

Figure 7A:
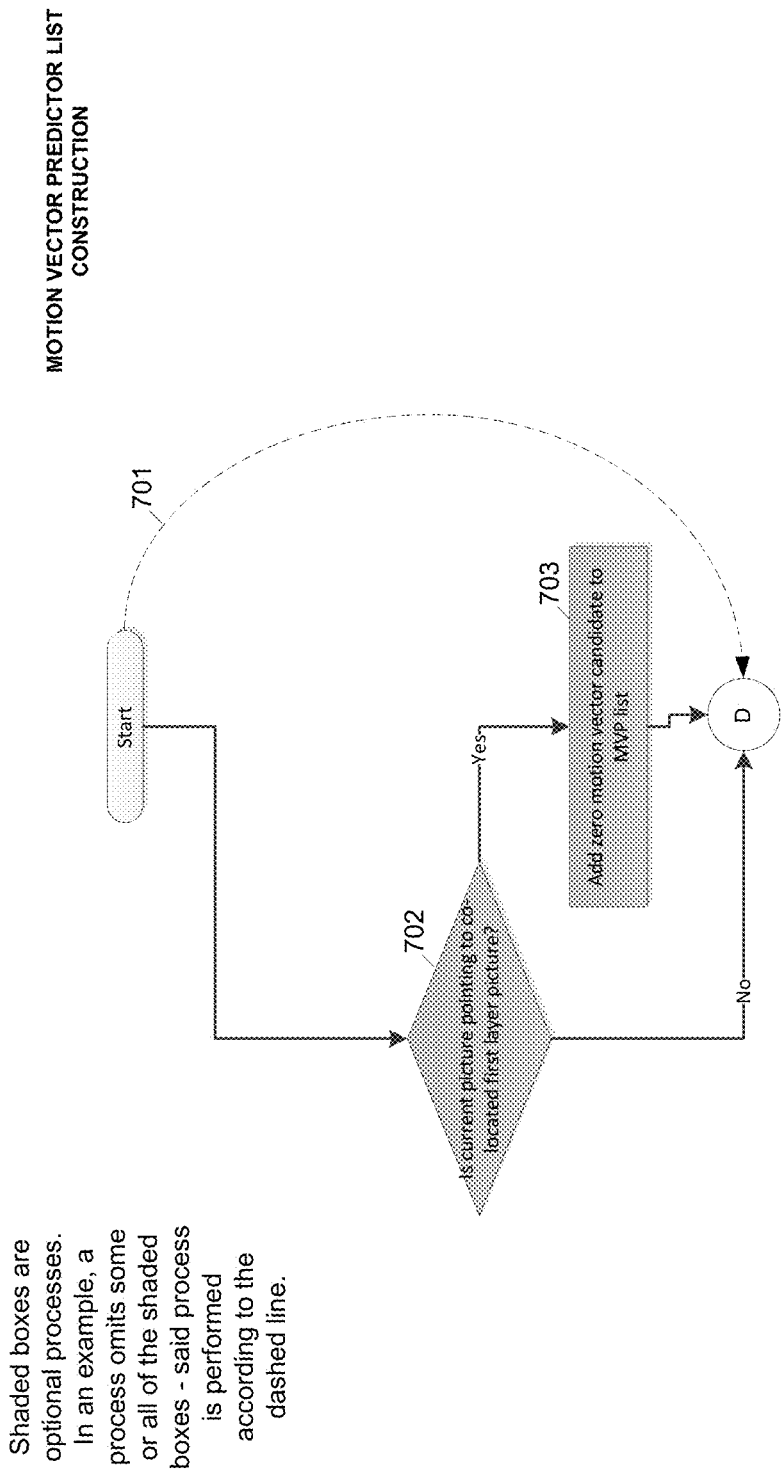
FIG. 7A is a flow diagram illustrating another configuration of motion vector predictor list construction on an electronic device.

FIG. 7A is a flow diagram illustrating another configuration of motion vector predictor list construction on an electronic device.

In an example, the electronic device 222 may be configured to perform some or all of processes 702 and 703 indicated by the shaded boxes and/or diamonds. However, in some examples the electronic device 222 is not configured with processes 702 and 703 (in such examples processing continues directly from start to "D" along the dashed line 701). A process including some or all of the shaded boxes and/or diamonds may use reduced bandwidth for transmissions to the decoder 212 as compared to a process following the dashed line 701. The optional processes 702 and 703 will be described in more detail later in the section entitled "MVP list modification for co-located first layer picture".

Figure 7B:
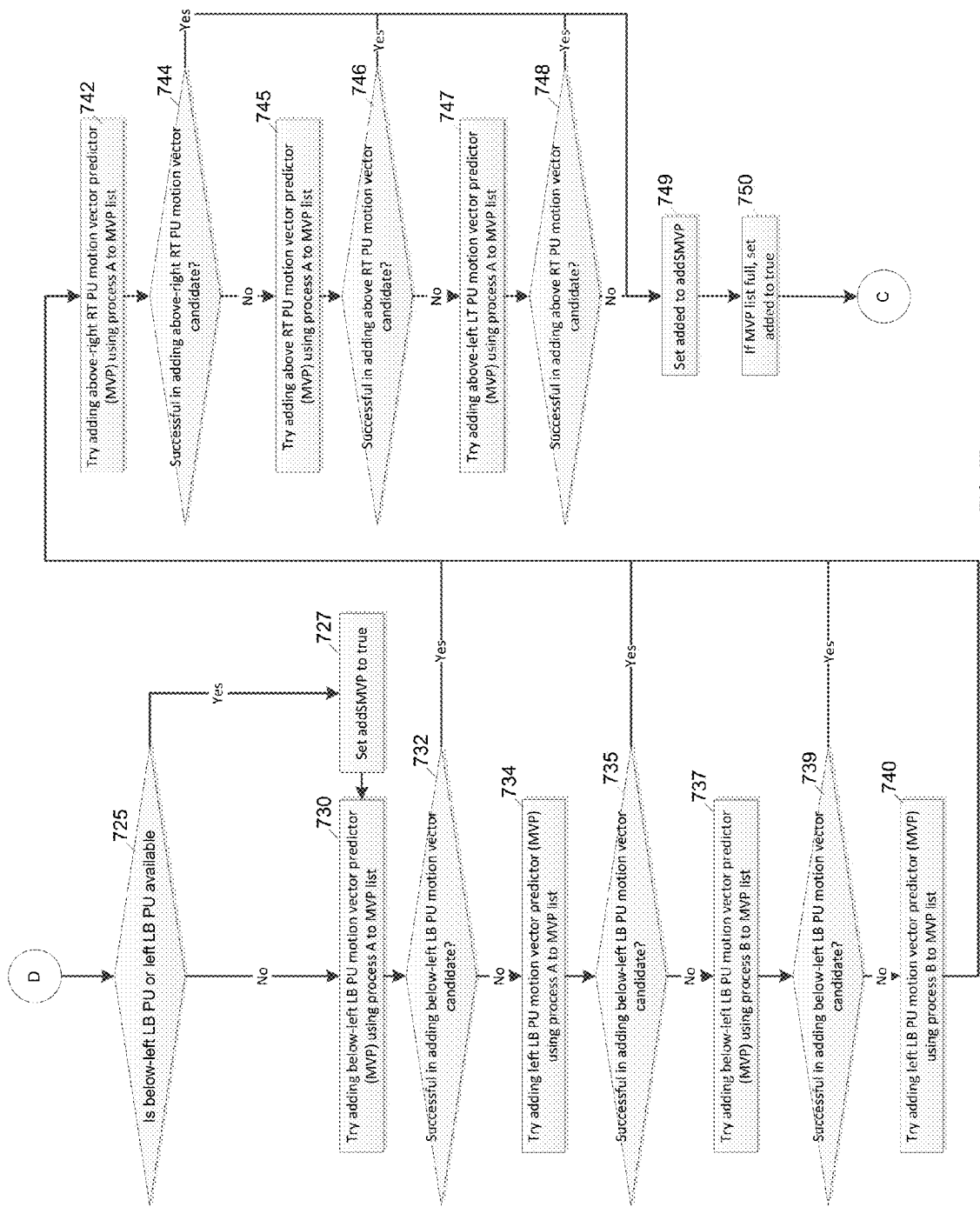
FIG. 7B is a flow diagram illustrating more of the configuration of motion vector predictor list construction of FIG. 7A.

FIG. 7B is a flow diagram illustrating more of the configuration of motion vector predictor list construction of FIG. 7A. Processes 725, 727, 730, 732, 734, 735, 737, 739, 740, 742, 744, 745, 746, 747, 748, 749, and 750 are similar to processes 625, 627, 630, 632, 634, 635, 637, 639, 640, 642, 644, 645, 646, 647, 648, 649, and 650 respectively.

Figure 7C:
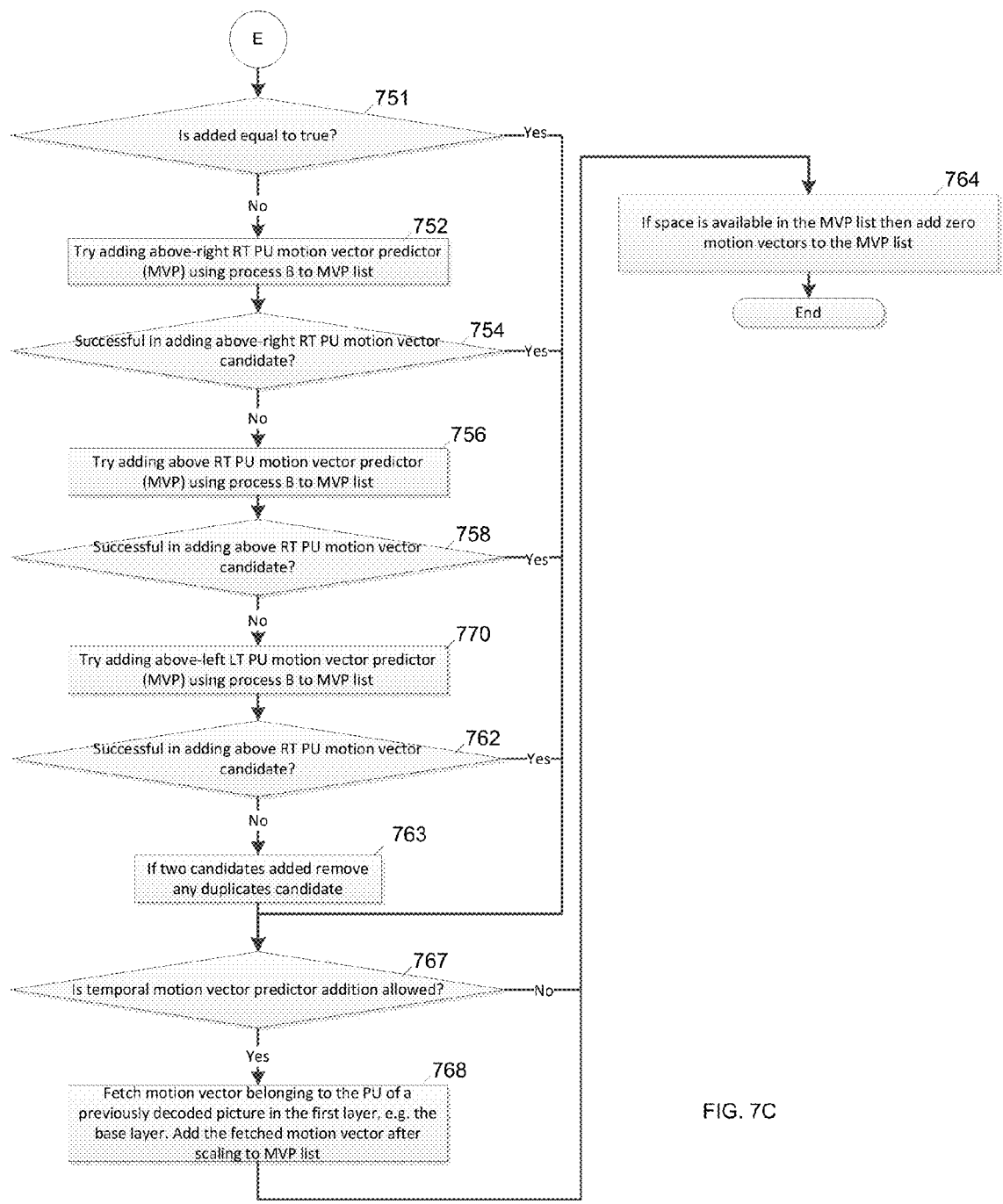
FIG. 7C is a flow diagram illustrating more of the configuration of motion vector predictor list construction of FIG. 7B.

FIG. 7C is a flow diagram illustrating more of the configuration of motion vector predictor list construction of FIG. 7B. Processes 751, 752, 754, 756, 758, 760, 762, 763, 767, and 768 are similar to processes 651, 652, 654, 656, 658, 660, 662, 663, 667, and 668, respectively.

Motion Vector Inference from First Layer

In some cases the motion vector used by a first layer, e.g. the base layer, when scaled appropriately can be used for a second higher layer, e.g. enhancement layer 0. It should be appreciated that the first layer may comprise a first enhancement layer, e.g. enhancement layer 0, and the second layer may comprise a second enhancement layer, e.g. enhancement layer 1, that is dependent on the first enhancement layer. If the first layer motion vector is used by the second layer, then the explicit transmission of a motion vector may be bypassed.

Figure 9:
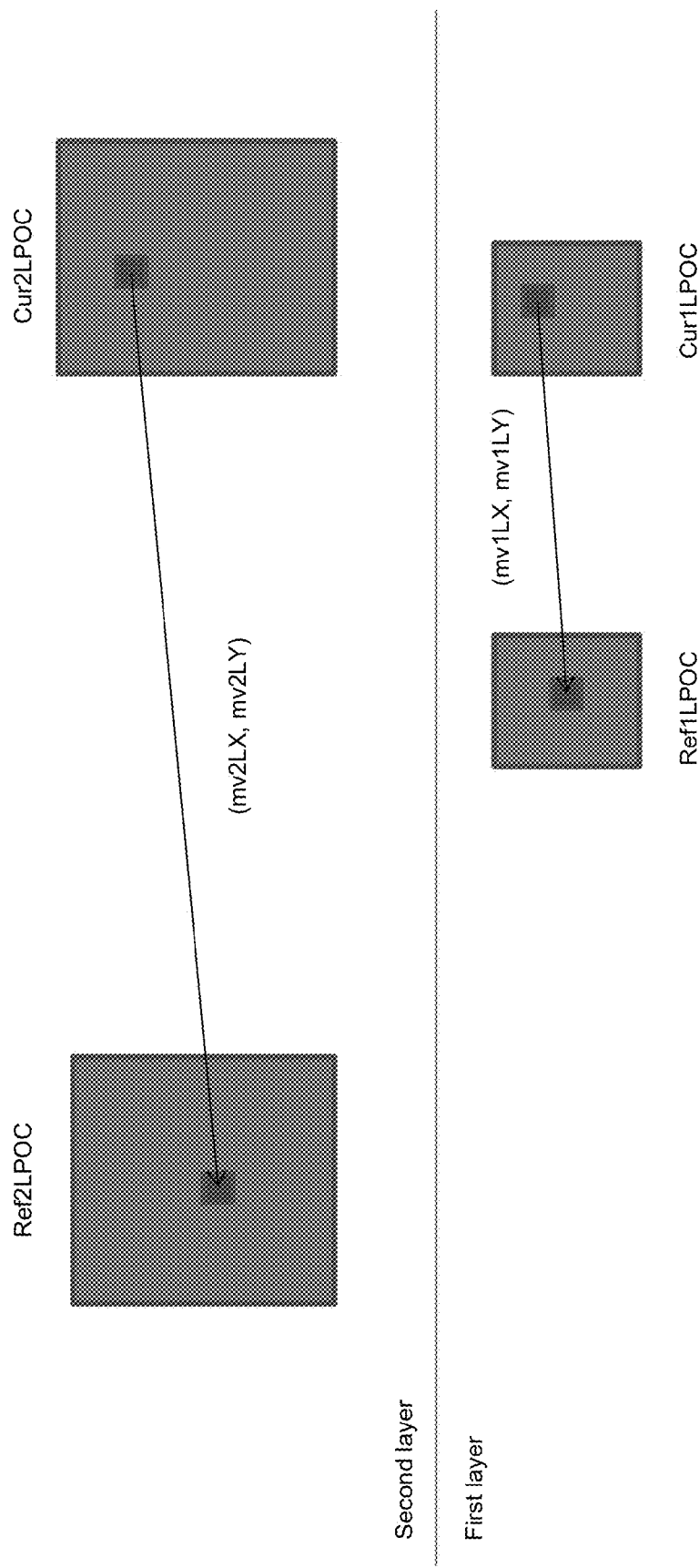
FIG. 9 is a diagram illustrating a relationship between Ref2LPOC, Cur2LPOC, Ref1LPOC, and Cur1LPOC.

In an example, the electronic device 221 may be configured to transmit signaling, e.g. a flag, a current second layer time instance, e.g. Cur2LPOC, and a reference second layer time instance, e.g. Ref2LPOC (POC is an abbreviation for Picture Order Count). The electronic device 222 may be configured to, responsive to identifying the signaling, e.g. the flag, determine a scale factor, i.e. "Scale" in FIG. 9, by determining the quotient the 1) difference of a current second layer time instance, e.g. Cur2LPOC, and the reference second layer time instance, e.g. Ref2LPOC and 2) the difference of two first layer time instances, e.g. Cur1LPOC and Ref1LPOC. The values Cur1LPOC and Ref1LPOC may be taken from an HEVC bitstream. FIG. 9 is a diagram illustrating a relationship between Ref2LPOC, Cur2LPOC, Ref1LPOC, and Cur1LPOC. In an example, scaling according to the scale factor comprises the mapping of motion vectors based on the temporal distance between prediction units and/or the mapping of motion vectors from the spatial resolution of the first layer and the second layer.

The electronic device 222 may be configured to determine mv2LX using the scale factor. In an example, the electronic device 222 is configured to determine a product of mv1LX, a quotient of SecondLayerPictureWidth and FirstLayerPictureWidth, and the scale factor.

The electronic device 222 may be configured to determine mv2LY using the scale factor. In an example, the electronic device 222 is configured to determine a product of mv1LY, a quotient of SecondLayerPictureHeight and FirstLayerPictureHeight, and the scale factor. In an example, the value obtained as a product of mv1LY, a quotient of SecondLayerPictureHeight and FirstLayerPictureHeight, and the scale factor my be clipped to a valid range. In an example if the reference picture (in the first layer/second layer) is a long term picture then the temporal distance based scaling corresponding to scale factor may be skipped.

In an example, if the second layer points to a co-located first layer picture (possibly processed, e.g. upsampled to match resolutions with second layer pictures), then the scaled motion vector is zero. Co-located first layer picture indicates the first layer picture, which has the same display time as the second layer picture under consideration.

Referring now to FIG. 3D, in an example, the electronic device 222 in process 381 determines whether the reference index is pointing to co-located first layer picture. If the reference index is pointing to a co-located first layer picture, then electronic device 222 in process 383 sets the motion vector to zero.

If the reference index is not pointing to the co-located first layer picture, then electronic device 222 in process 384 receives motion vector infer indicator, e.g. a motion vector infer flag. The electronic device 222 in process 385 determines whether the motion vector infer indicator is true. If true, the electronic device 222 in process 386 sets the motion vector to the scaled first layer motion vector. If not true, the electronic device 222 performs previously-described process 387.

In an example, the motion vector infer indicator is coded using statistics of a previously coded motion vector infer indicator from the bitstream. In an example, such coding is context based arithmetic coding.

In an example, the motion vector infer indicator may be signaled only if the first layer and the second layer have the same slice type.

In an example, a single motion vector indicator may be signaled for more than one list, e.g. for list 0 and list 1.

Adding Scaled First Layer Motion Vector to the MVP List

The scaled first layer motion vector may be added as a candidate to the MVP list.

Referring now to FIG. 6A, the electronic device 222 in process 602 fetches a motion vector from a co-located first layer picture. The electronic device 222 in process 603 determines whether the fetch was successful. If successful, the electronic device 222 in process 605 scales the first layer motion vector and adds to MVP list. Otherwise, the electronic device 222 performs previously-described process 625.

In an example, the scaled first layer motion vector candidate may be added to a predefined location in the MVP list. In an example, the predefined location is just prior to addition of zero motion vector candidates. In an example, the predefined location is the first location, e.g. an initial location, in the MVP list.

In an example, the scaled first layer motion vector may replace a candidate in the MVP list. In such an example, the list size of the second layer may be the same as the list size of the first layer.

In an example, the scaled first layer motion vector is added based on a control signal, e.g. a flag, transmitted earlier in the bitstream. In an example, the scaled first layer motion vector is added based on a control signal, e.g. a flag, transmitted earlier in the second layer bitstream.

In an example, for the second layer, the selection of the scaled first layer motion vector may be signaled as an index into the MVP list. In another example, for the second layer, the selection of the scaled first layer motion vector may be signaled as a conditionally transmitted control signal. The latter case is discussed below with reference to FIG. 3D.

Referring now to FIG. 3D, in an example, the electronic device 222 in process 392 determines whether the scaled first layer motion vector was successfully fetched. If successful, the electronic device 222 in process 394 receives the first_layer_motion_vector_flag. The electronic device 222 in process 395 determines whether the first_layer_motion_vector_flag is false. If false, the electronic device 222 performs the previously-described process 397. If true, the electronic device 222 uses the scaled first layer motion vector as a predictor for the current CU. The motion vector predictor when added to the motion vector difference gives the motion vector of the PU under consideration.

In an example, the first_layer_motion_vector_flag is coded using statistics of a previously coded first_layer_motion_vector_flag from the bitstream. In an example, such coding is context based arithmetic coding.

Merge Candidate Using First Layer Motion Information

In an example, a merge candidate using the first layer motion information can be made available to the second layer. The merge candidate contains reference index and motion vector information for list 0, list 1, and the inter-prediction mode. In an example, referring to FIG. 9, the first layer merge candidate formation process is as follows:

Ref2LPOC corresponds to the picture which is at the same temporal distance from the Cur2LPOC as Cur1LPOC is from Ref1LPOC The motion vector may be scaled as follows:

Scale1LMergeX=(SecondLayerPictureWidth/FirstLayerPictureWidth)

mv2LX=mv1LX*Scale1LMergeX

Scale1LMergeY=(SecondLayerPictureHeight/FirstLayerPictureHeight)

mv2LY=mv1LY*Scale1LMergeY

The inter-prediction mode for the candidate is determined based on availability of first layer motion information for list 0 and list 1, for example, if only list 0 information is available for first layer then the inter prediction mode of the second layer is set to indicate that only a reference picture pointing to list 0 is used for the current PU In an example, the electronic device 221 signals the selection of first layer motion information for the merge process using an indicator, e.g. first_layer_merge_flag. The electronic device 221 is configured to conditionally transmit the first_layer_merge_flag prior to transmission of the merge index. If the a first_layer_merge_flag is true, then the transmission of the merge index is skipped. In an example, the first_layer_merge_flag is coded using statistics of a previously coded first_layer_merge_flag in the bitstream. In an example, such coding is context based arithmetic coding.

Referring now to FIG. 3B, the electronic device 222 in process 328 determines whether the first layer motion merge candidate is fetched successfully. A motion merge candidate may be fetched successfully if the reference index associated with the candidate is valid and the motion vector from the co-located PU in the temporally co-located first layer picture was fetched successfully. If not successful, then the electronic device 222 performs previously-described process 337.

If the first layer motion merge candidate is fetched successfully, then the electronic device 222 in process 330 receives the first layer merge flag. The electronic device 222 in process 332 determines whether the first layer merge flag is true. If true, then in process 334, the scaled first layer motion information is identified for copying to the current PU. In an example, this can be achieved by setting the merge candidate index to point to a candidate in the merge list corresponding to the first layer motion merge candidate. The electronic device 222 performs previously-described process 335. If the first layer flag is not true, then the electronic device 222 performs previously-described process 337.

In an example, the first layer merge flag is not required. The first layer motion information is added to the merge list thereby modifying the merge list construction process. In an example, the first layer motion information may replace an existing candidate in the merge list, thereby keeping the length of the merge list the same as in the first layer. In an example, the first layer motion merge candidate may be added to any location in the merge list, e.g. the top of the list. A merge index is then transmitted to signal which merge candidate is chosen. In an example, the first layer motion merge candidate is added based on a control signal, e.g. a flag, transmitted earlier in the bitstream.

Referring now to FIG. 4B, the electronic device 222 in process 487 fetches motion information corresponding to, e.g. belonging to, the PU of a co-located first layer picture. The electronic device 222 in process 488 determines the first layer motion merge candidate as a scaled motion vector corresponding to, e.g. belonging to, the PU of a co-located first layer picture, and determines reference index of the merge candidate's reference index as the reference index of the second layer picture co-located with the first layer reference picture.

The electronic device 222 in process 489 determines whether the first layer merge candidate was successfully determined. A first layer merge candidate may be successfully determined if the reference index associated with the candidate is valid and the motion vector from the co-located PU in the temporally co-located first layer picture was fetched successfully. If successful, the electronic device 222 in process 490 adds motion information from the first layer motion merge candidate to the merge list. The electronic device 222 performs previously-described process 491.

MVP List Modification for Co-Located First Layer Picture

In an example, the electronic device 222 determines whether the current picture in the second layer points to the co-located first layer picture. If so, then the electronic device 222 modifies MVP list construction to have a zero motion vector candidate, e.g. a single zero motion vector candidate.

Referring now to FIGS. 3D and 7A, in an example system where the electronic device 222 is configured to follow dashed line 374 (FIG. 3D), the optional processes 702 and 703 (FIG. 7A) may be used. In such example, the electronic device 222 in process 702 determines whether the current picture points to the co-located first layer picture. If so, then the electronic device 222 in process 703 adds a zero motion vector candidate to the MVP list. In an example, the MVP list construction process is skipped and the motion vector predictor for the current PU is set to a zero motion vector.

Figure 10:
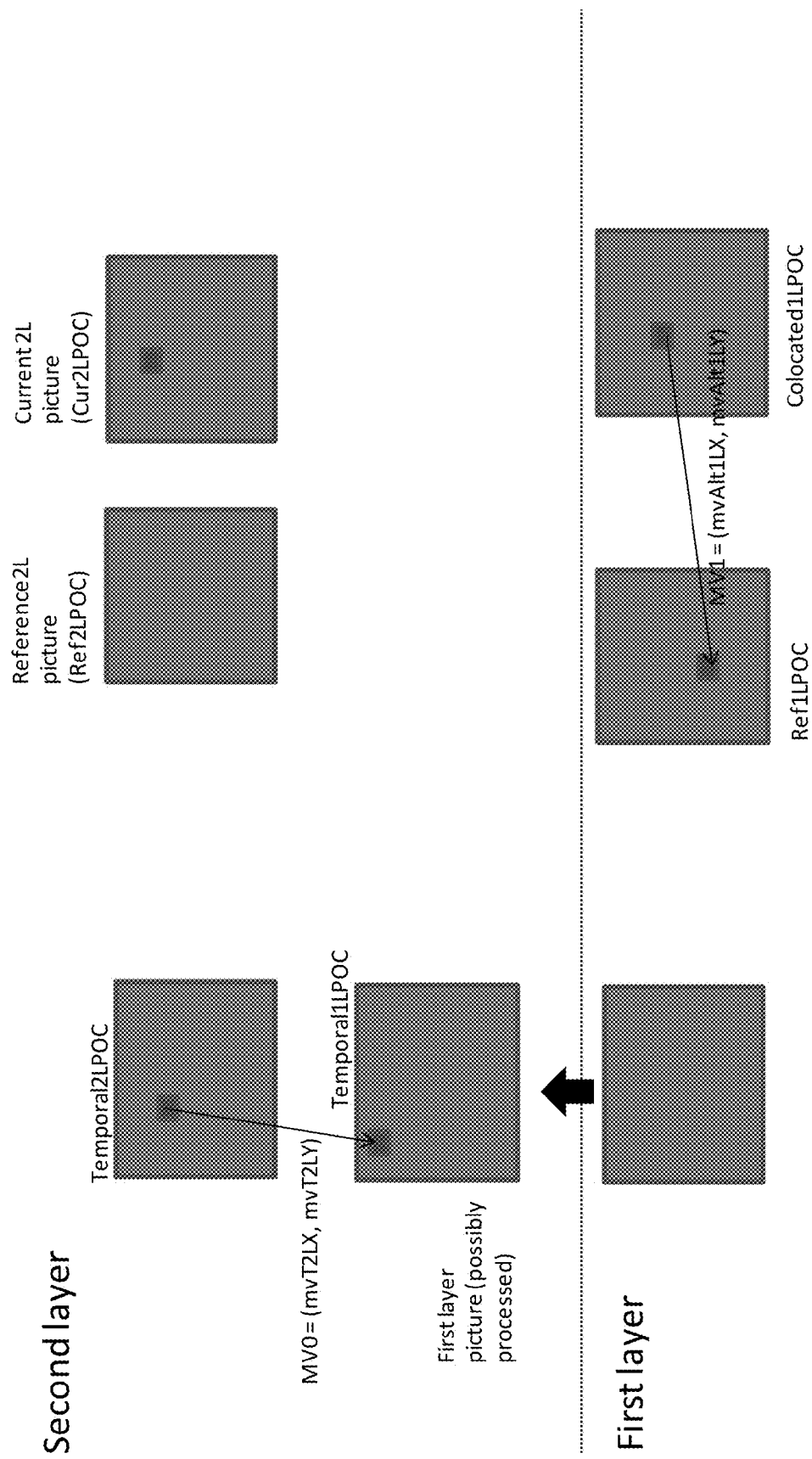
FIG. 10 illustrates a temporal motion vector candidate pointing to its co-located first layer picture and the current reference picture is not the co-located first layer picture.

Alternate MVP Candidate if Temporal Motion Vector Predictor Points to its Co-Located First Layer Picture and Current Reference Picture is not the Co-Located First Layer Picture FIG. 10 illustrates a temporal motion vector candidate pointing to its co-located first layer picture and the current reference picture is not the co-located first layer picture. In an example, the electronic device 222 may be configured to replace the first motion vector by scaled second motion vector in an MVP list. In an example, scaled second motion vector may be obtained from the co-located PU in the temporally co-located first layer picture. Any of the previously discussed scaling processes may be used for scaling MV1.

In an example, co-located 1LPOC is the co-located first layer picture of the current second layer picture (cur2LPOC). In an example, ref1LPOC is a reference picture for co-located 1LPOC. In an example, ref2LPOC is a reference picture for cur2LPOC. In an example, temporal2LPOC is a previously decoded picture of the second layer. In an example, temporal1LPOC is the representation of the first layer picture co-located with temporal2LPOC. In an example, mvT2LX is the horizontal displacement component of motion vector MV0. In an example, mvT2LY is the vertical displacement component of motion vector MV0.

Figure 11:
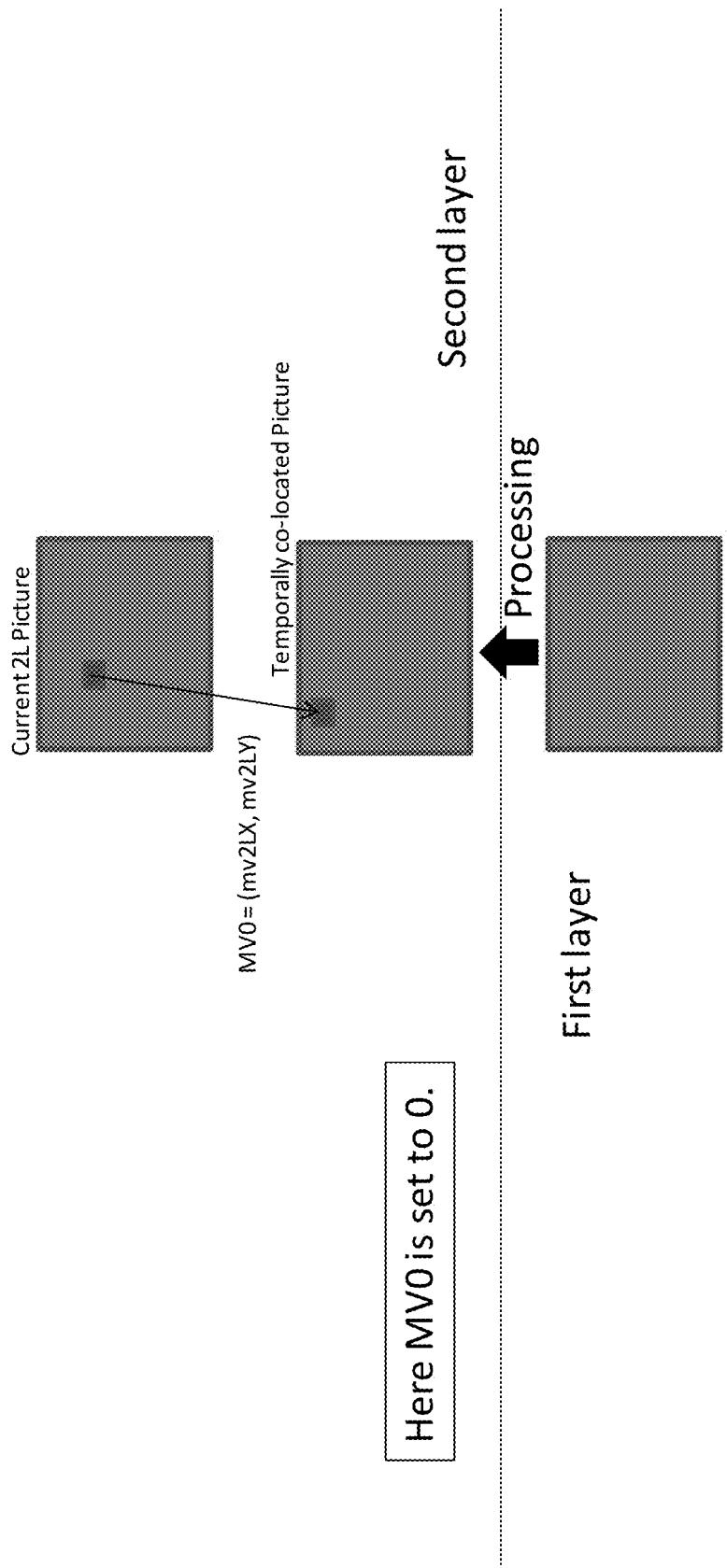
FIG. 11 illustrates a second layer picture pointing to a temporally co-located picture.

Scaling of Motion Vector is Set to Zero if Pointing to Temporally Co-Located Picture for MVP List In an example, for the motion vector predictor list construction, the electronic device 222 may be configured to, if the second layer picture points to a temporally co-located picture (possibly obtained after processing the co-located first layer picture) as shown in FIG. 11, set the MVP candidate to a zero motion vector.

Scaling of Motion Vector is Set to Zero if Pointing to Temporally Co-Located Picture for Merge List In an example, for the merge list construction, the electronic device 222 may be configured to, if the second layer picture points to a temporally co-located picture (possibly obtained after processing the co-located first layer picture) as shown in FIG. 11, set a motion vector of the merge candidate to zero.

Figure 12:
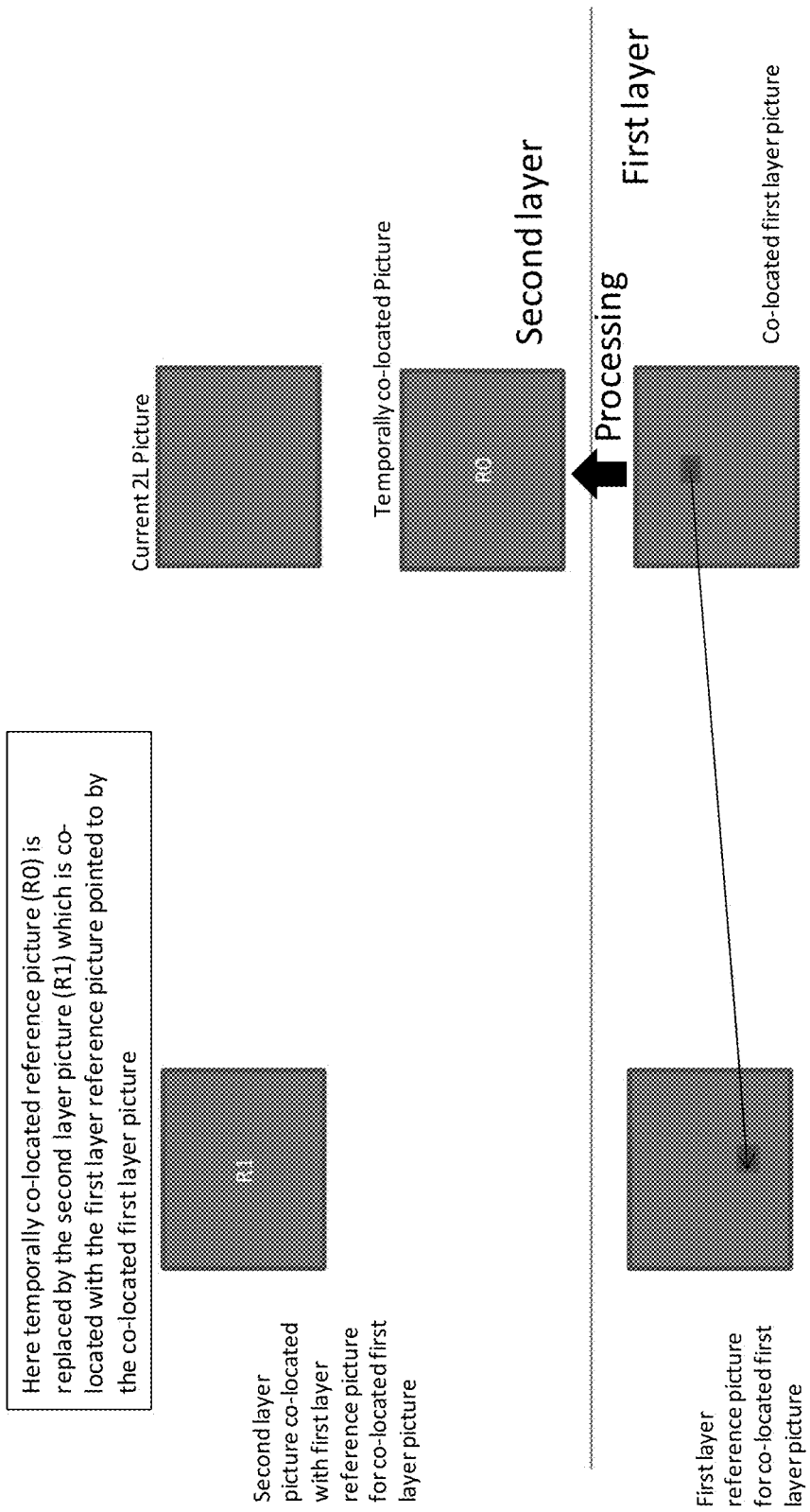
FIG. 12 is a diagram to illustrate setting the reference index of the merge candidate to the second layer picture co-located with first layer reference picture for co-located first layer picture.

Alternate Reference Picture if Initial Candidate Points to Co-Located First Layer Picture In an example, for the merge list construction, the electronic device 222 may be configured to, if the second layer picture points to a temporally co-located picture (possibly obtained after processing the co-located first layer picture) as shown in FIG. 12, set the reference index of the merge candidate to the second layer picture co-located with first layer reference picture for co-located first layer picture.

Up-Sampling First Layer Motion Information

The first layer and the second layer may be different resolutions, e.g. a picture of the first layer may be a lower resolution than a picture of the second layer. In an example, the electronic device 222 may be configured to perform up-sample processing when the second layer is at a higher resolution than the first layer. Up-sampling motion and mode information results in data units in the second layer picture having corresponding data units in the first layer picture. In an example, the electronic device 222 is configured to perform the up-sampling process before using the motion and mode information by the second layer.

In an example, the up-sampling process comprises a sample and hold process. In an example, data units of the up-sampling process comprise at least one of a transform unit, a coding unit, a prediction unit, a picture, and a slice.

For up-sampling, for the first layer sample(s) under consideration, the first layer CTU address is determined and mapped to a CTU address in the second layer. This mapping may be based on the spatial scale factor and/or the spatial location of the first layer sample(s) under consideration and/or the first layer PU spatial location of the sample(s) under consideration. As a second step, for the first layer sample(s) under consideration first layer PU is mapped to a second layer PU. This mapping may be based on the spatial scale factor and/or the spatial location of the first layer sample(s) under consideration and/or the first layer PU spatial location of the sample(s) under consideration.

Figure 13:
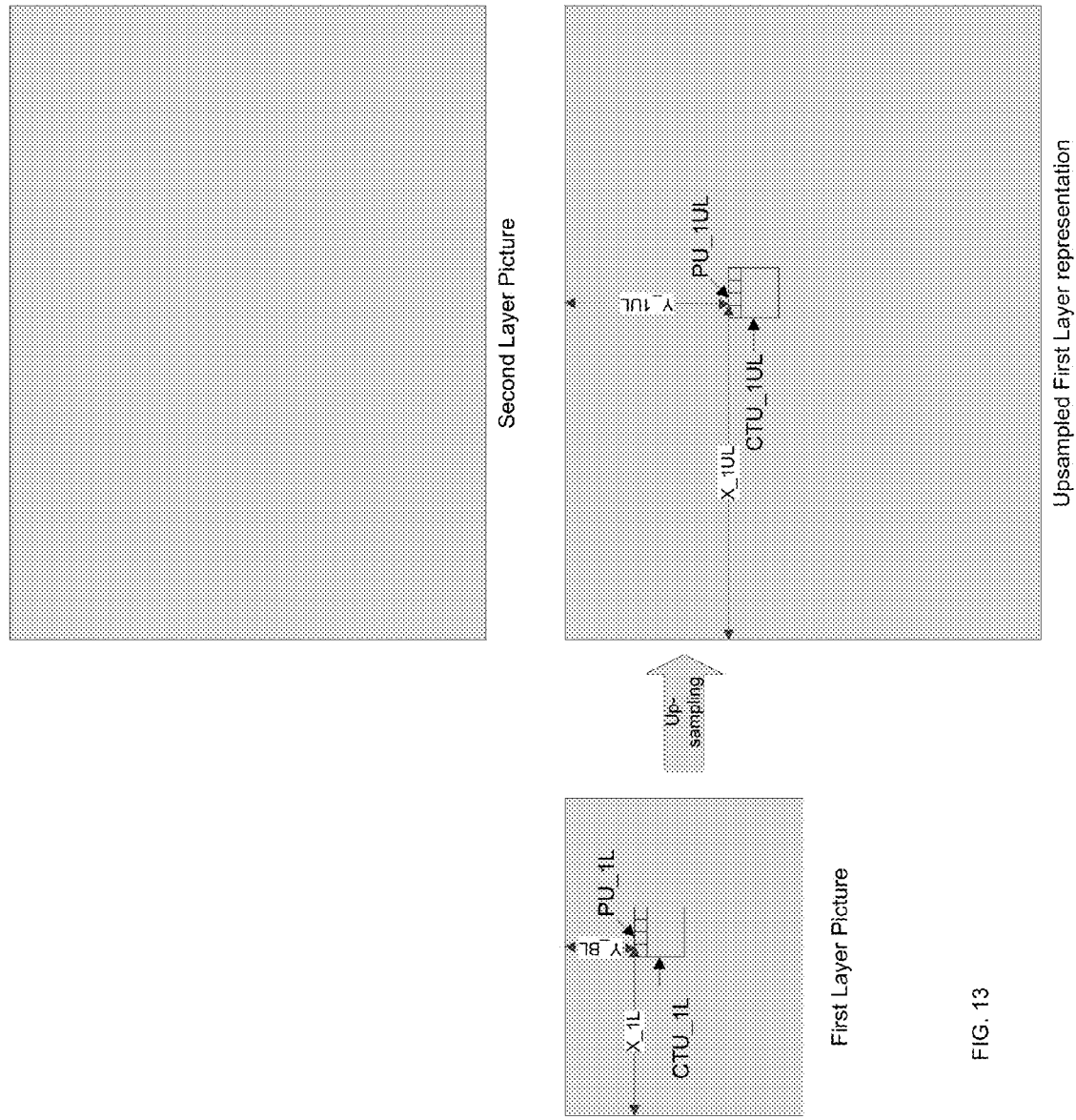
FIG. 13 illustrates a mapping process between a first layer data unit and a data unit in the first layer representation.

FIG. 13 illustrates an example up-sampling of base layer data. The first layer CTU "CTU_1L" is mapped to a CTU in the up-sampled _first layer representation. The CTU in the up-sampled first layer representation has the second layer address "CTU_1UL". Similarly, the first layer PU identified by address PU_1L in CTU_1L is mapped to a PU in the up-sampled second layer representation. The PU in the up-sampled first layer representation has the second layer address PU_1UL (lying within CTU CTU_1UL). CTU_1UL and PU_1UL identify a prediction unit in the up-sampled first layer representation. The first layer prediction unit data for (CTU_1L, PU_1L) may be copied to prediction unit (CTU_1UL, PU_1UL). In an example, the first layer prediction unit data for (CTU_1L, PU_1L) along with data from neighboring PU's may be processed and copied to prediction unit (CTU_1UL, PU_1UL). In an example, when a second layer process is looking to fetch information from a co-located PU in a first layer picture, it can directly map the spatial location of the sample under consideration for the second layer picture to a sample at the same spatial location of the first layer representation. The sample in the first layer representation belongs to a PU. This PU and the information carried in this PU represents the co-located PU of the first layer picture.

In an example, first layer information input into the up-sampling process comprises a motion vector, a reference index, a prediction mode, and/or a partition size. In an example, the electronic device 222 may be configured to scale and clip the motion vector to account for the resolution change.

Figure 14:
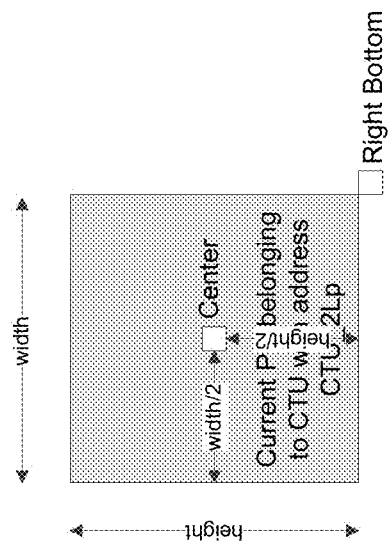
FIG. 14 illustrates the various sample positions in a prediction unit.

The electronic device 222 may fetch a motion vector (mv1LX, mv1LY) from a co-located PU at a temporally co-located first layer picture. A temporally co-located first layer picture is the first layer picture which is at the same time instance as the second layer picture. In one embodiments this time instance may correspond to display time. Fetching the motion information from the first layer entails identifying a PU in the first layer upsampled picture based on the current PU of the second layer. As a first step the right bottom sample for the current PU (as shown in FIG. 14) is identified. If the right bottom sample lies outside the second layer boundaries then the center sample of the current PU (as shown in FIG. 14) is identified. The CTU address of the current PU, say CTU_2Lp, identifies a CTU, say CTU_1ULp, in the first layer representation. In some embodiments, the first layer representation and the second layer picture follow the same labeling for CTU's (in such an event CTU_L2p is equal to CTU_ULp). The spatial location of the center sample identified in the second layer can be mapped to a corresponding spatial location in the first layer representation. This sample in the first layer representation corresponds to a prediction unit. This prediction unit may carry two motion vectors corresponding to list 0 and list 1. Based on the current list under consideration and data transmitted earlier in the bitstream (such as slice type, flags indicating a list preference) one of the two lists is chosen. The motion vector (mv1LX, mv1LY) is set to the motion vector corresponding to the chosen list. If the right bottom sample lies inside the second layer picture boundaries then the CTU to which this right bottom sample belongs is determined. Say the determined CTU address is CTU_2Lq then a corresponding CTU in the first layer representation, say CTU_1ULq is determined. In some embodiments, the first layer representation and the second layer picture follow the same labeling for CTU's (in such an event CTU_L2q is equal to CTU_1ULq). The spatial location of the right bottom sample identified in the second layer can be mapped to a corresponding spatial location in the first layer representation. This sample in the first layer representation corresponds to a prediction unit. This prediction unit may carry two motion vectors corresponding to list 0 and list 1. Based on the current list under consideration and data transmitted earlier in the bitstream (such as slice type, flags indicating a list preference) one of the two lists is chosen. The motion vector (mv1LX, mv1LY) is set to the motion vector corresponding to the chosen list. In some embodiments, if the right bottom sample lies below the current CTU boundary then the mv1LX and mv1LY may be set to zero. In some embodiments, if the prediction unit being accessed in the first layer representation is not available (for example it is an intra coded prediction unit, or a flag was previously transmitted in the bitstream to indicate that access to the prediction unit is disallowed) then it is indicated that the fetch was not successful. The electronic device 222 may be configured to determine mv2LX using the scale factor. In an example, the electronic device 222 is configured to determine a product of mv1LX, a quotient of SecondLayerPictureWidth and FirstLayerPictureWidth, and the scale factor. In an example, the value obtained as a product of mv1LX, a quotient of SecondLayerPictureWidth and FirstLayerPictureWidth, and the scale factor is clipped to a valid range. In an example if the reference picture (in the first layer/second layer) is a long term picture then the temporal distance based scaling corresponding to scale factor may be skipped.

Pixel Difference Mode Operation

Some video decoders may generate predictions in pixel difference mode. For the picture under consideration, the encoder generates a pixel difference representation by calculating the difference of a primary predictor from the original. The primary predictor may be obtained after processing the co-located base layer picture data. The encoder then signals a secondary predictor for this pixel difference representation. The decoder uses both the primary and secondary predictors to determine an estimate of the original pixel value.

The pixel values of the upsampled decoded first layer pictures may be used for generating a primary predictor and an initial estimate of the original pixel value. A secondary predictor is now generated for the pixel difference representation (described above). This mode of operation is called the difference coding mode. The secondary prediction is generated using the difference representation of decoded second layer reference picture and the upsampled first layer co-located pictures. The primary and secondary predictors are used to obtain an initial estimate of the original pixel value.

In an example, when operating in the difference coding mode, motion vectors are not allowed to point to a co-located first layer picture (possibly obtained after processing). As a result, during the merge list candidate construction process candidates pointing to co-located first layer picture are not added to the merge list. In an example, other suitable alternative candidates which do not point to co-located first layer picture may be added to the merge list.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

A processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A system, comprising:
an electronic device of a decoder, the electronic device configured to:
receive a first layer bitstream;
receive a second enhancement layer bitstream corresponding to the first layer bitstream;
wherein the second enhancement layer bitstream is dependent on the first layer bitstream;
determine whether a motion vector infer control signal in the second enhancement layer bitstream is equal to a predetermined value;
responsive to determining that the motion vector infer control signal in the second enhancement layer bitstream is equal to the predetermined value, decode a current prediction unit of the second enhancement layer bitstream using a motion vector derived from a motion vector of the first layer bitstream; and
responsive to determining that the motion vector infer control signal in the second enhancement layer bitstream is not equal to said predetermined value, construct a motion vector predictor list derived from the second enhancement layer bitstream and use the motion vector predictor list for the current prediction unit of the second enhancement layer bitstream.

2. The system of claim 1, wherein the electronic device is further configured to:
determine a scale factor; and
scale the motion vector of the first layer bitstream according to the scale factor to provide the derived motion vector; and
decode the second enhancement layer picture using the derived motion vector.

3. The system of claim 2, wherein determining the scale factor comprises:
determining a difference of two time instances of the second enhancement layer bitstream;
determining a difference of two time instances of the first layer bitstream;
wherein the scale factor comprises a quotient of the differences.

4. The system of claim 1, wherein the first layer bitstream comprises a first enhancement layer bitstream of a base layer bitstream.

5. The system of claim 1, wherein the electronic device is further configured to:
determine whether a reference index of the second enhancement layer points to a co-located first picture layer; and
responsive to determining that the reference index points to the co-located first picture layer, set a motion vector of the second enhancement layer to zero.

6. The system of claim 1, wherein the electronic device is further configured to:
determine whether to perform a merge process for the current prediction unit;
wherein said determine whether the motion vector infer control signal in the second enhancement layer bitstream is equal to the predetermined value is in response to determining that the merge process is not to be performed for the current prediction unit;
responsive to determining that the merge process is to be performed for the current prediction unit, determine a value of a first layer merge control signal; and
set a merge index for the current prediction unit to a first layer motion merge candidate index according to a result of the first layer merge control signal determination.

7. The system of claim 1, wherein the electronic device is further configured to:
construct a merge list for the second enhancement layer bitstream; and
add motion information from a first layer motion merge candidate to the merge list.

8. The system of claim 1, wherein the electronic device is further configured to:
   construct a motion vector predictor list for the second enhancement layer bitstream;
   determine a scale factor;
   scale said motion vector of the first layer bitstream according to the scale factor to provide the derived motion vector; and
   add said derived motion vector to the motion vector predictor list.

9. The system of claim 8, wherein the electronic device is further configured to add said derived motion vector to a predefined location of the motion vector predictor list.

10. The system of claim 8, wherein the electronic device is further configured to replace an entry in the motion vector predictor list with the derived motion vector.

11. A system, comprising:
   an electronic device of a decoder, the electronic device configured to:
   receive a first layer bitstream;
   receive a second enhancement layer bitstream corresponding to the first layer bitstream;
   wherein the second enhancement layer bitstream is dependent on the first layer bitstream;
   determine whether a merge control signal for a prediction unit of the second enhancement layer bitstream is equal to a first predetermined value;
   responsive to determining that the merge control signal is equal to the first predetermined value, determine whether a first layer merge control signal for a first layer motion merge candidate is equal to a second predetermined value;
   responsive to determining that the first layer merge control signal for the first layer motion merge candidate is equal to the second predetermined value, set a merge index for the second enhancement layer bitstream equal to the first layer motion merge candidate index;
   responsive to determining that the merge control signal is not equal to the first predetermined value, determine whether a motion vector infer control signal in the second enhancement layer bitstream is equal to a third predetermined value; and
   responsive to determining that the motion vector infer control signal in the second enhancement layer bitstream is equal to the third predetermined value, decode the prediction unit of the second enhancement layer bitstream using a motion vector derived from a motion vector of the first layer bitstream.

12. The system of claim 11, wherein the electronic device is further configured to, responsive to determining that the motion vector infer control signal is not equal to said third predetermined value, construct the motion vector predictor list derived from the second enhancement layer bitstream and use the motion vector predictor list for the current prediction unit of the second enhancement layer bitstream.

13. A system, comprising:
   an electronic device of a decoder, the electronic device configured to:
   receive a first layer bitstream;
   receive a second enhancement layer bitstream corresponding to the first layer bitstream;
   wherein the second enhancement layer bitstream is dependent on the first layer bitstream;
   determine whether a merge control signal for a prediction unit of the second enhancement layer bitstream is equal to a first predetermined value; and
   responsive to determining that the merge control signal is not equal to the first predetermined value, determine a scale factor, scale said motion vector according to the scale factor, and add said scaled motion vector to a motion vector predictor list derived from the second enhancement layer bitstream;
   responsive to determining that the merge control signal is equal to the first predetermined value, determine whether a first layer merge control signal for first layer motion merge candidate is equal to a second predetermined value; and
   responsive to determining that the first layer merge control signal for first layer motion merge candidate is equal to the second predetermined value, set a merge index for the second enhancement layer bitstream equal to the first layer motion merge candidate index.

14. The system of claim 13, wherein the electronic device is further configured to:
   responsive to determining that the merge control signal in the second enhancement layer bitstream is not equal to the first predetermined value, determine whether a motion vector infer control signal in the second enhancement layer bitstream is equal to a third predetermined value;
   wherein determining the scale factor, scaling said motion vector according to the scale factor, and adding said scaled motion vector to the motion vector predictor list derived from the second enhancement layer bitstream is responsive to determining that the motion vector infer control signal is equal to the third predetermined value; and
   responsive to determining that the motion vector infer control signal in the second enhancement layer bitstream is not equal to said third predetermined value, construct the motion vector predictor list derived from the second enhancement layer bitstream and use the motion vector predictor list for the current prediction unit of the second enhancement layer bitstream.

* * * * *